United States Patent
Watanabe

(10) Patent No.: US 9,794,532 B2
(45) Date of Patent: Oct. 17, 2017

(54) PROJECTOR CONTROL APPARATUS, PROJECTOR SYSTEM, AND PROJECTOR CONTROL METHOD

(71) Applicant: Panasonic Intellectual Property Management Co., Ltd., Osaka (JP)

(72) Inventor: Tatsumi Watanabe, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/868,075

(22) Filed: Sep. 28, 2015

(65) Prior Publication Data
US 2016/0021348 A1 Jan. 21, 2016

Related U.S. Application Data

(63) Continuation of application No. PCT/JP2015/001151, filed on Mar. 4, 2015.

(30) Foreign Application Priority Data

Mar. 24, 2014 (JP) .................................. 2014-059512

(51) Int. Cl.
*H04N 3/22* (2006.01)
*H04N 3/26* (2006.01)
(Continued)

(52) U.S. Cl.
CPC ......... *H04N 9/3138* (2013.01); *G03B 21/008* (2013.01); *G03B 37/04* (2013.01);
(Continued)

(58) Field of Classification Search
USPC .... 348/745, 744, 739, 477, 478, 479, 398.1, 348/211.1; 345/1.1, 1.3, 156, 173, 633,
(Continued)

(56) References Cited

U.S. PATENT DOCUMENTS 5,756,981 A * 5/1998 Roustaei ................. G03F 7/705
235/462.07
5,986,674 A * 11/1999 Yamato ................... A63F 13/10
345/441
(Continued)

FOREIGN PATENT DOCUMENTS

JP   10-301202 A   11/1998
JP   2002-116498 A   4/2002
(Continued)

OTHER PUBLICATIONS

International Search Report issued in International Application No. PCT/JP2015/001151 dated Jun. 2, 2015.

*Primary Examiner* — Jefferey F Harold
*Assistant Examiner* — Mustafizur Rahman
(74) *Attorney, Agent, or Firm* — McDermott Will & Emery LLP

(57) ABSTRACT

A projector control apparatus that causes plural projectors to collectively project an image by individually projecting a different one of segment images into which the image is divided, the apparatus including: a spatial distribution information obtaining unit which obtains information indicating a distribution of one or more viewers that view the image in a space where the projectors are mounted; a mode selecting unit which selects, using the information indicating the distribution of the one or more viewers, one of modes including (i) a first mode in which a width of a projection area is a first width and (ii) a second mode in which the width of the projection area is a second width larger than the first width; and a projector control unit which changes arrangement of the segment images by controlling each of projection directions according to the mode selected.

10 Claims, 18 Drawing Sheets

(51) Int. Cl.

| | |
|---|---|
| *H04N 9/31* | (2006.01) |
| *H04N 5/74* | (2006.01) |
| *G03B 37/04* | (2006.01) |
| *G06F 3/14* | (2006.01) |
| *G06F 3/00* | (2006.01) |
| *H04N 5/232* | (2006.01) |
| *G03B 21/00* | (2006.01) |
| *G03B 21/13* | (2006.01) |
| *G09G 3/00* | (2006.01) |

(52) U.S. Cl.
CPC ............ *G06F 3/005* (2013.01); *G06F 3/1446* (2013.01); *H04N 5/23229* (2013.01); *H04N 5/74* (2013.01); *H04N 9/3188* (2013.01); *G03B 21/13* (2013.01); *G09G 3/002* (2013.01); *G09G 2300/026* (2013.01); *G09G 2320/0693* (2013.01); *G09G 2330/026* (2013.01); *G09G 2370/022* (2013.01)

(58) Field of Classification Search
USPC ............... 345/634; 353/7, 10, 30, 46, 48, 94
See application file for complete search history.

(56) References Cited

U.S. PATENT DOCUMENTS

| | | | |
|---|---|---|---|
| 5,988,817 A | 11/1999 | Mizushima et al. | |
| 6,530,662 B1* | 3/2003 | Haseltine | G02B 27/2292 353/10 |
| 7,394,450 B2 | 7/2008 | Shibamiya et al. | |
| 8,038,304 B2 | 10/2011 | Mizuuchi et al. | |
| 8,269,902 B2 | 9/2012 | Plut | |
| 2004/0257337 A1 | 12/2004 | Shibamiya et al. | |
| 2006/0055792 A1* | 3/2006 | Otsuka | G01S 3/7864 348/211.4 |
| 2006/0256302 A1* | 11/2006 | Hsu | G03B 21/625 353/94 |
| 2006/0275678 A1* | 12/2006 | Hoshino | G03F 1/32 430/30 |
| 2007/0058141 A1* | 3/2007 | Ozaki | G02B 17/02 353/98 |
| 2009/0040133 A1* | 2/2009 | Clodfelter | H04N 9/3147 345/1.1 |
| 2009/0207322 A1 | 8/2009 | Mizuuchi et al. | |
| 2010/0002193 A1* | 1/2010 | Hines | G02B 27/2214 353/7 |
| 2010/0214537 A1* | 8/2010 | Thomas | G02B 27/225 353/7 |
| 2010/0309390 A1 | 12/2010 | Plut | |
| 2011/0159929 A1* | 6/2011 | Karaoguz | H04N 13/0404 455/566 |
| 2012/0019612 A1* | 1/2012 | Choudury | H04N 13/0011 348/36 |
| 2012/0092445 A1* | 4/2012 | McDowell | G06K 9/00201 348/14.16 |
| 2012/0236884 A1* | 9/2012 | Fujimoto | H01S 3/106 372/26 |
| 2012/0299800 A1* | 11/2012 | Seo | G03B 21/14 345/1.3 |
| 2012/0314017 A1* | 12/2012 | Gross | G02B 27/2214 348/14.07 |
| 2013/0114191 A1* | 5/2013 | Fuchu | B42D 17/00 361/679.01 |
| 2013/0208008 A1* | 8/2013 | Otera | G03B 21/142 345/634 |
| 2013/0321312 A1 | 12/2013 | Higashi et al. | |
| 2013/0342814 A1* | 12/2013 | Atkins | G02B 27/22 353/7 |
| 2014/0043452 A1* | 2/2014 | Ehrlacher | G02B 27/2214 348/59 |
| 2014/0218418 A1* | 8/2014 | Bastani | G09G 3/2003 345/691 |
| 2014/0285641 A1* | 9/2014 | Kato | G06F 3/013 348/54 |
| 2015/0042640 A1* | 2/2015 | Algreatly | G06T 3/005 345/419 |
| 2015/0332504 A1* | 11/2015 | Wang | G06T 15/20 345/633 |

FOREIGN PATENT DOCUMENTS

| | | |
|---|---|---|
| JP | 2003-153136 A | 5/2003 |
| JP | 2004-318121 A | 11/2004 |
| JP | 2005-157135 A | 6/2005 |
| JP | 2006-086717 A | 3/2006 |
| JP | 2007-079210 A | 3/2007 |
| JP | 2007-300540 A | 11/2007 |
| JP | 2012-529223 A | 11/2012 |
| JP | 2013-165323 A | 8/2013 |
| JP | 2013-167660 A | 8/2013 |
| JP | 2013-178368 A | 9/2013 |
| JP | 2013-195498 A | 9/2013 |
| JP | 2013-246804 A | 12/2013 |
| WO | 2008/004438 A1 | 1/2008 |
| WO | 2010/141149 A2 | 12/2010 |

* cited by examiner

PROJECTOR CONTROL APPARATUS, PROJECTOR SYSTEM, AND PROJECTOR CONTROL METHOD

CROSS REFERENCE TO RELATED APPLICATIONS

This is a continuation application of PCT International Application No. PCT/JP2015/001151 filed on Mar. 4, 2015, designating the United States of America, which is based on and claims priority of Japanese Patent Application No. 2014-059512 filed on Mar. 24, 2014. The entire disclosures of the above-identified applications, including the specifications, drawings and claims are incorporated herein by reference in their entirety.

FIELD

The present disclosure relates to a projector control apparatus, a projector system, and a projector control method for controlling image projection.

BACKGROUND

An example of projector systems that use a projector is a projector system which sets the projection area according to an action of a user in a public space (see Patent Literature (PTL) 1, for example). This projector system can project an image on a wall near the user, and, as the user moves, move the projection area according to the movement of the user. The projection area is moved by changing the projection direction of the projector, for example.

CITATION LIST

Patent Literature

[PTL 1] Japanese Unexamined Patent Application Publication No. 2005-157135

SUMMARY

Technical Problem

However, the projector system changes the projection direction of the projector using a mechanical structure, and thus requires a certain length of time for the change. Consequently, when the user performs a manipulation which involves a change of the projection direction, and especially when the projection direction is to be changed significantly, the preparation period necessary before projecting the next image increases.

The present disclosure provides a projector control apparatus, a projector system, and a projector control method that enable reduction of the preparation period necessary for image projection.

Solution to Problem

A projector control apparatus according to the present disclosure is a projector control apparatus that causes plural projectors to collectively project an image by individually projecting a different one of segment images into which the image is divided, the projector control apparatus including: a spatial distribution information obtaining unit configured to obtain information indicating a distribution of one or more viewers that view the image in a space where the projectors are mounted; a mode selecting unit configured to select, using the information indicating the distribution of the one or more viewers, one of modes including (i) a first mode in which a width of a projection area is a first width and (ii) a second mode in which the width of the projection area is a second width larger than the first width, the projection area being an area in which the image is projected; and a projector control unit configured to change arrangement of the segment images by controlling, according to the mode selected, each of projection directions in which the projectors project the segment images.

Advantageous Effects

The projector control apparatus, projector system, and projector control method according to the present disclosure can reduce the preparation period necessary for image projection.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Hereinafter, non-limiting embodiments will be described in detail with reference to the drawings as necessary. Note, however, that detailed descriptions may be omitted where unnecessary. For example, detailed descriptions of well-known aspects or repetitive descriptions of essentially similar configurations may be omitted. This is to make the following description easier for those skilled in the art to understand and avoid redundancy.

Note that the inventor provides the accompanying drawings and the following description, not to limit the scope of the claims, but to aid those skilled in the art to adequately understand the present disclosure.

Embodiment 1

Hereinafter, Embodiment 1 will be described with reference to FIG. 1 through FIG. 8.

The present embodiment will describe an exemplary case where a projector system includes plural projectors and is provided in a house (room). The projector system according to the present embodiment has a function of causing plural projectors to collectively project an image by individually projecting a different one of segment images into which the image is divided.

In the present embodiment, the number of projectors is four, and each projector projects a different one of four segment images into which an image is divided. In the present embodiment, there are two sizes for the image to be projected: a normal image and a wide image having a width larger than the width of the normal image. There are two manners in which an image is divided: the normal image is divided into two rows×two columns, and the wide image is divided into one row×four columns. Put it differently, the projector system according to the present embodiment can display the normal image and the wide image by changing the arrangement of the segment images. It is to be noted that the number of projectors, that is, the number of segment images into which an image is divided, is not limited to 4, and any number is possible.

1-1. Overall Configuration

Figure 1:
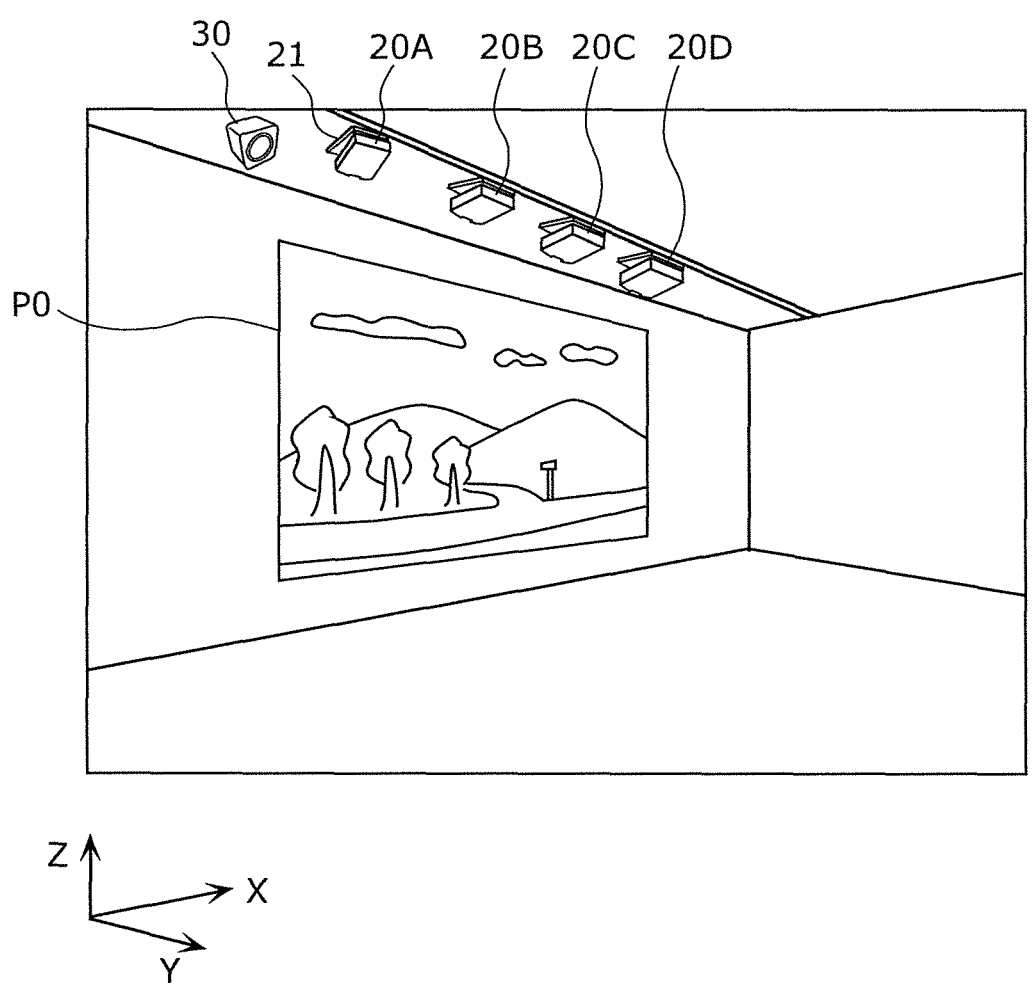
FIG. 1 is a perspective view illustrating an example of a setup of a projector system according to Embodiment 1.
Figure 2:
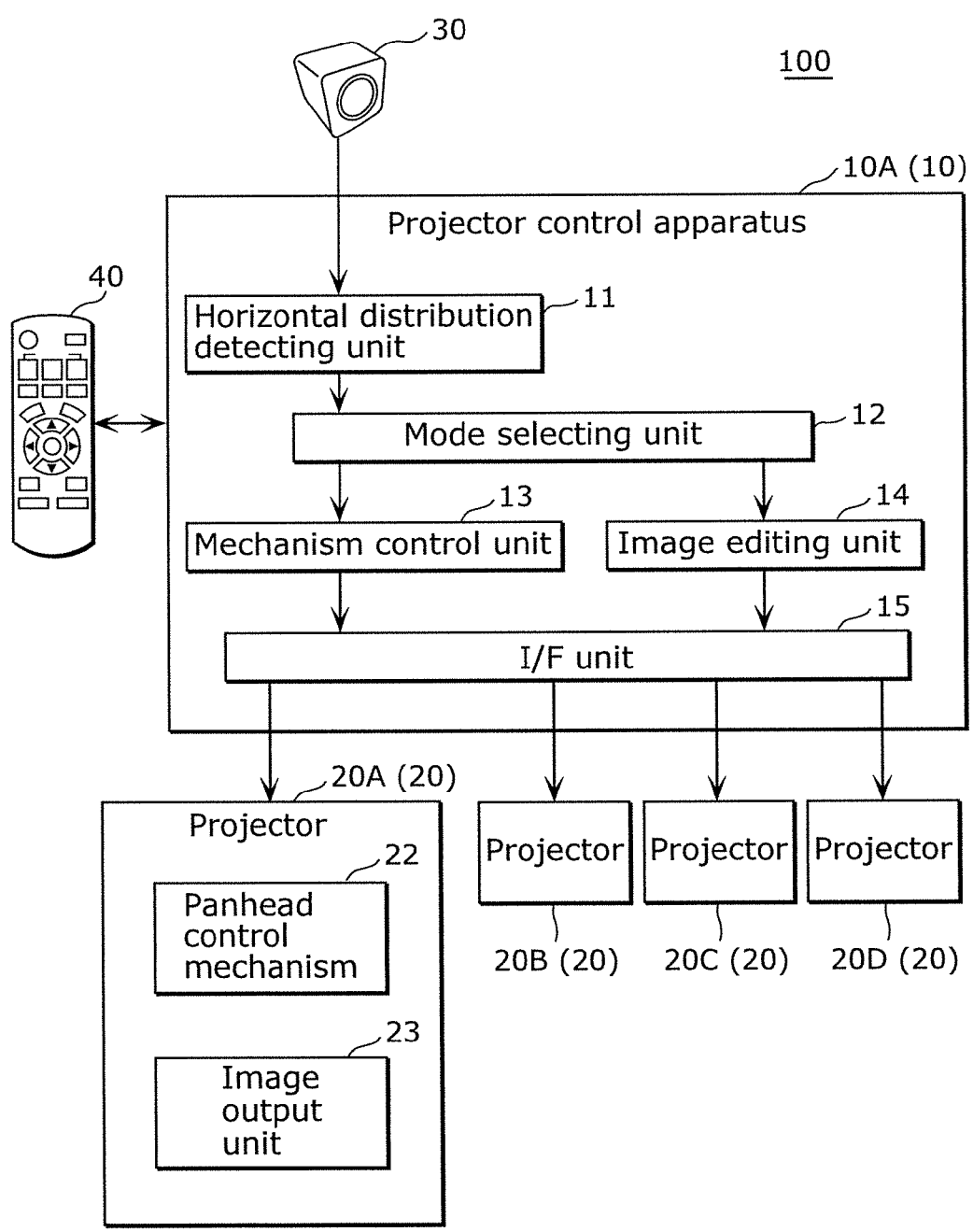
FIG. 2 is a block diagram illustrating an example of the configuration of a projector system according to Embodiment 1.

FIG. 1 is a perspective view illustrating an example of a setup of a projector system 100 according to the present embodiment. FIG. 2 is a block diagram illustrating an example of the configuration of the projector system 100 according to the present embodiment. In the drawings, the X direction is the width direction (width direction of an image projected on a wall), the Y direction is the depth direction (direction perpendicular to the wall), and the Z direction is the height direction (direction perpendicular to the floor).

As illustrated in FIG. 1 and FIG. 2, the projector system 100 includes projectors 20A through 20D, a time of flight (TOF) sensor 30, a remote control 40, and a projector control apparatus 10A.

[1-1-1. Projector]

Each of the projectors 20 (projectors 20A through 20D) is an apparatus that projects an image on, for example, a white wall or screen according to control by the projector control apparatus 10A. The present embodiment will describe the case where an image is projected on a wall.

An example of the projectors 20 is a digital light processing (DLP (registered trademark)) projector. The DLP projector is a projector that uses a digital mirror device. It is to be noted that the projectors may be other type of projectors such as cathode-ray tube (CRT) projectors.

The projectors 20A through 20D are each mounted on a ceiling via a panhead 21, at a position several tens of centimeters to several meters distant from the wall on which images are projected. In the present embodiment, the projectors 20A through 20D are equally spaced. The space between the projectors 20A through 20D is determined according to, for example, the size of a projection area P0 in which images are projected by the projectors 20A through 20D, and the distance to the projection area P0.

As illustrated in FIG. 1 and FIG. 2, each of the projectors 20 is mounted on the panhead 21 and includes a panhead control mechanism 22 and an image output unit 23.

Each panhead 21 is fixed to the ceiling. On each panhead 21, a corresponding one of the projectors 20 is mounted. Each panhead 21 can change the angle and orientation of the corresponding projector 20 according to a signal from the panhead control mechanism 22. The angle of the projector 20 refers to the angle between the panhead 21 (ceiling) and the image projection direction of the projector 20. By adjusting this angle, the position of the image in the vertical direction can be adjusted. By adjusting the orientation of the projector 20, the position of the image in the horizontal direction can be adjusted.

The panhead control mechanism 22 is a mechanism for automatically adjusting the image projection direction according to a control signal from the projector control apparatus 10A. The panhead control mechanism 22 outputs a signal specifying an angle and an orientation of the projector 20 to the panhead 21 based on the control signal. It takes about several seconds for the panhead 21 to adjust the position of the projector 20.

The image output unit 23 projects an image according to image data provided from the projector control apparatus 10A.

[1-1-2. TOF Sensor]

The TOF sensor 30 is a sensor that measures the distance to an object. More specifically, the TOF sensor 30 projects signal light and detects a difference between the phase of the signal light and the phase of reflected light of the signal light (amount of shift in phase) to calculate a time period from the projection of the signal light to the reception of the reflected light, and derives the distance from the time period calculated.

The TOF sensor 30 is mounted on or near the wall on which images are projected. In the case of FIG. 1, the TOF sensor 30 is hung from the ceiling, and is mounted closer to the wall on which images are projected than the projectors 20 are.

Figure 3:
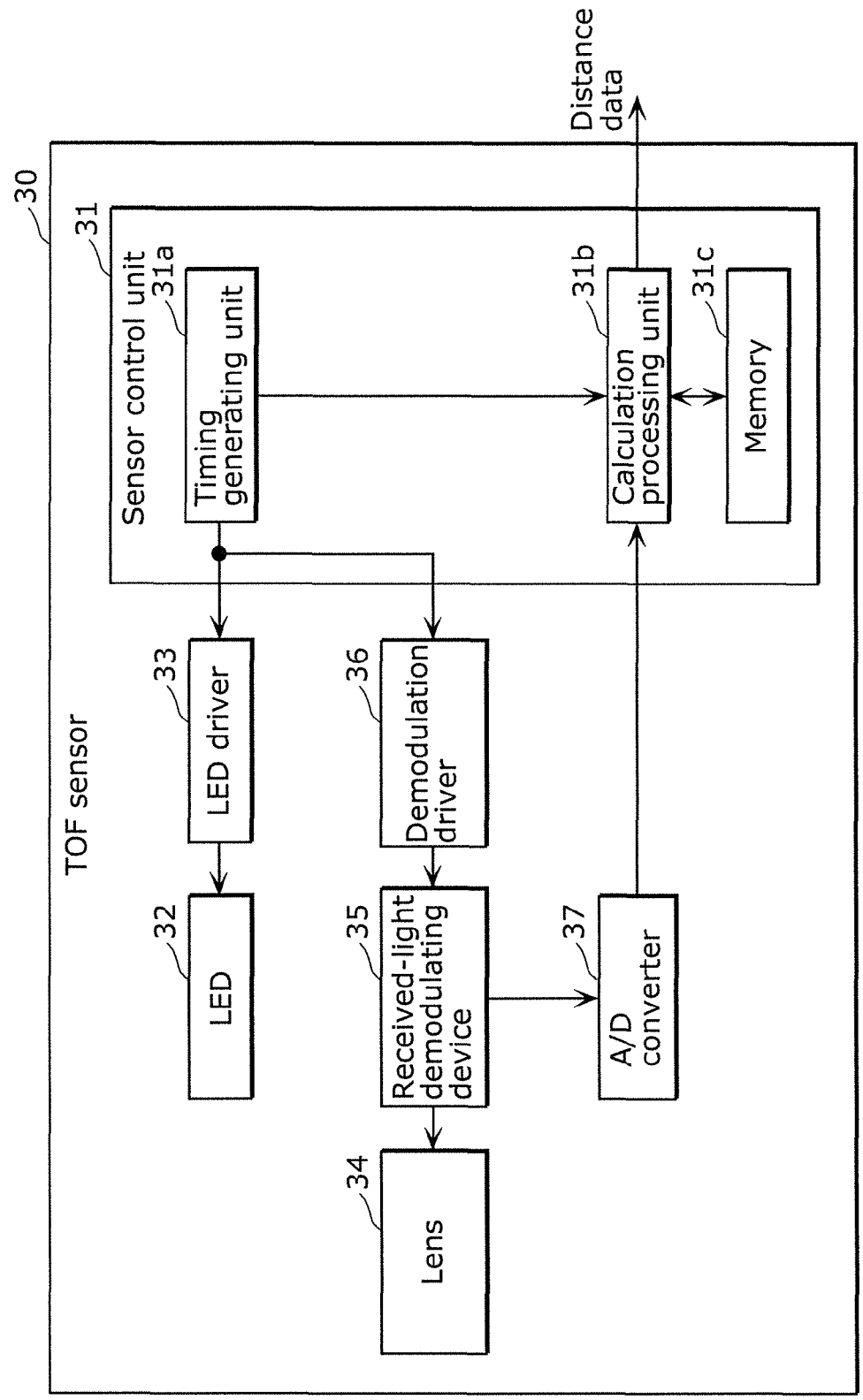
FIG. 3 is a block diagram illustrating an example of the configuration of a TOF sensor according to Embodiment 1.

FIG. 3 is a block diagram illustrating an example of the configuration of the TOF sensor 30 according to the present embodiment. The TOF sensor 30 illustrated in FIG. 3 includes a sensor control unit 31, a light emitting diode (LED) 32, an LED driver 33, a lens 34, a received-light demodulating device 35, a demodulation driver 36, and an A/D converter 37. The TOF sensor 30 may further include an analog front end (AFE), for example.

The sensor control unit 31 includes a timing generating unit 31$a$, a calculation processing unit 31$b$, and a memory 31$c$. The timing generating unit 31$a$ and the calculation processing unit 31*b* are implemented by such an integrated circuit as an application specific integrated circuit (ASIC). The memory 31*c* is a memory for storing, for example, data used for the distance calculation by the calculation processing unit 31*b*, and is implemented using a static random access memory (SRAM), for example.

To measure the distance to an object, the TOF sensor 30 causes, using the LED driver 33, the LED 32 to project signal light with the timing generated by the timing generating unit 31*a*. In addition, the TOF sensor 30 drives the received-light demodulating device 35 using the demodulation driver 36, with the timing generated by the timing generating unit 31*a*. By doing so, it is possible to precisely match the timing with which the LED 32 projects the signal light and the timing with which the received-light demodulating device 35 is driven, thereby enabling precise detection of the amount of shift in phase.

The TOF sensor 30 converts the signal light received by the received-light demodulating device 35 via the lens 34, to a digital signal using the A/D converter 37. The calculation processing unit 31*b* of the TOF sensor 30 calculates the distance to the object using the digital signal output from the A/D converter 37.

As the result of the distance detection, the TOF sensor 30 outputs a gray-scale image with lower luminance (darker) when the distance is smaller and outputs a gray-scale image with higher luminance (brighter) when the distance is larger, for example. It is to be noted that the TOF sensor 30 may output distance values each indicated by a different one of the pixels of the gray-scale image. Furthermore, the TOF sensor 30 may output a gray-scale image with higher luminance (brighter) when the distance is smaller and output a gray-scale image with lower luminance (darker) when the distance is larger.

[1-1-3. Projector Control Apparatus]

As described earlier, the projector control apparatus 10A is an apparatus that causes plural projectors 20 to collectively project an image by individually projecting a different one of segment images into which the image is divided.

For example, the projector control apparatus 10A includes a central processing unit (CPU) and a storage device, and is implemented by the CPU executing a computer program (software) of a projector control method according to the present embodiment. The projector control apparatus 10A can be configured using any device such as an existing server or a personal computer (PC). Although not illustrated in FIG. 1, the projector control apparatus 10A may be embedded in the wall or ceiling, or may be included in a server provided in the room.

As illustrated in FIG. 2, the projector control apparatus 10A includes a horizontal distribution detecting unit 11, a mode selecting unit 12, a mechanism control unit 13, an image editing unit 14, and an interface (I/F) unit 15. The details of the operations of each unit will be described in [Operations] section below. A brief summary of each unit will be given here.

The horizontal distribution detecting unit 11 is an example of a spatial distribution information obtaining unit that obtains information indicating a distribution of viewers in the space where the projectors 20A through 20D are mounted (hereinafter abbreviated as "viewer distribution information" where appropriate). The horizontal distribution detecting unit 11 according to the present embodiment detects, as the viewer distribution information, information indicating a distribution of the viewers present in the room in the width direction of the projection area (hereinafter abbreviated as "width direction distribution information" where appropriate), according to the information output from the TOF sensor 30.

The mode selecting unit 12 selects a display mode according to the viewer distribution information detected by the horizontal distribution detecting unit 11. Display modes include a first mode in which the width of the projection area in which an image is projected is a first width, and a second mode in which the width of the projection area is a second width larger than the first width. According to the present embodiment, the first mode is a mode for displaying the above-described normal image, and the second mode is a mode for displaying the above-described wide image.

It is to be noted that although the width of the projected image changes depending on whether the image is displayed in the first mode or the second mode, this change in the width is not brought about by a change in the size of the segment images projected by the projectors 20A through 20D, but by a change in the arrangement of the segment images projected by the projectors 20A through 20D. Hereinafter, a specific description will be given with reference to FIG. 4 and FIG. 5.

Figure 4:
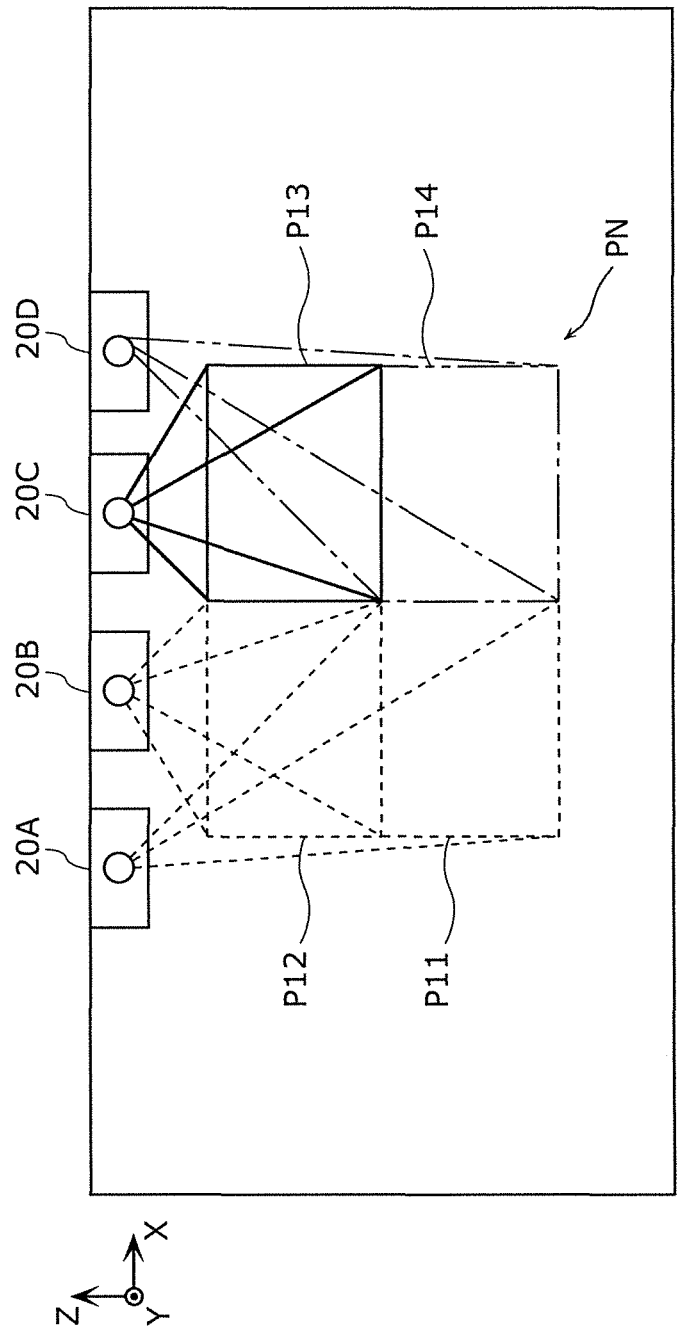
FIG. 4 illustrates an example of image division in a first mode according to Embodiment 1.

FIG. 4 illustrates an example of image division in the first mode according to the present embodiment. As illustrated in FIG. 4, in the first mode, one normal image PN is divided into segment images P11 through P14 in two rows×two columns. The normal image PN is, for example, an image of an ordinary (i.e., not wide) television program.

Figure 5:
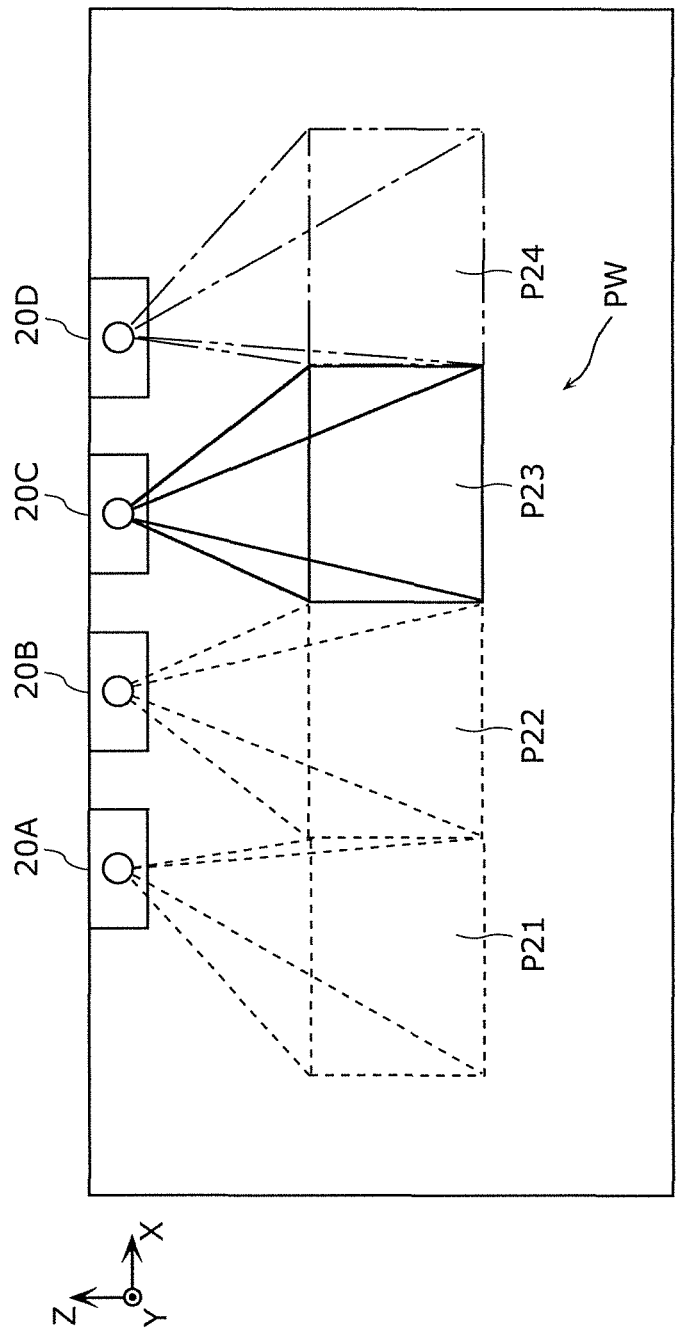
FIG. 5 illustrates an example of image division in a second mode according to Embodiment 1.

FIG. 5 illustrates an example of image division in the second mode according to the present embodiment. As illustrated in FIG. 5, in the second mode, one wide image PW is divided into segment images P21 through P24 in one row×four columns. The wide image PW is, for example, an image of a content item such as sports or a movie.

In the present embodiment, although the normal image PN and the wide image PW have different lengths in the width and height directions, the segment images P11 through P14 and the segment images P21 through P24 are all in the same size.

The mode selecting unit 12 in the present embodiment determines, from the width direction distribution information, whether or not at least one viewer is present outside a predetermined range, and (i) selects the first mode when determining that no viewer is present outside the predetermined range, and (ii) selects the second mode when determining that at least one viewer is present outside the predetermined range.

The mechanism control unit 13 is an example of a projector control unit that changes the arrangement of the segment images by controlling, according to the display mode selected by the mode selecting unit 12, each of projection directions in which the projectors 20A through 20D project the segment images. To allow each segment image to be projected at a position set according to the selected display mode, the mechanism control unit 13 outputs, to each of the projectors 20A through 20D, a control signal for adjusting the projection direction.

According to the display mode selected by the mode selecting unit 12, the image editing unit 14 outputs, to each of the projectors 20A through 20D, image data for projecting a corresponding segment image.

The I/F unit 15 is an interface that outputs the control signal and the image data to each of the projectors 20.

[1-1-4. Remote Control]

The remote control 40 is a device used by the viewers for turning on and off the power, selecting a content item, changing the volume, and so on, and can communicate with the projector control apparatus 10A via wireless communication such as infrared communication.

1-2. Operations (Projector Control Method)

Figure 6:
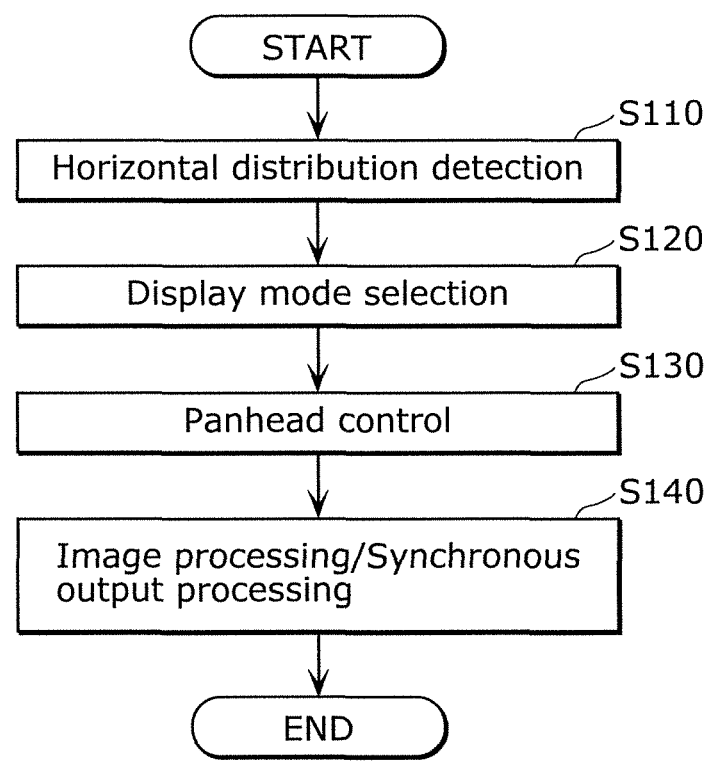
FIG. 6 is a flowchart illustrating an example of the procedures of display mode selection (projector control method) according to Embodiment 1.

FIG. 6 is a flowchart illustrating an example of the procedures of the display mode selection (projector control method) according to the present embodiment.

The display mode selection illustrated in FIG. 6 is performed when a viewer presses the power button on the remote control 40, that is, when the power is turned on, for example.

Here, with a typical projector control apparatus, every time the power is turned on, an image which had been projected at the previous power-off is projected immediately after the power-on. After that, with a viewer manipulation, the image is switched to an image of a content item the viewers wish to view. When the image projected immediately after the power-on (image which had been projected at the previous power-off) and the image of the content item selected by the viewers thereafter are different in type (a normal image and a wide image), a substantial amount of time elapses before the viewer can view the selected content item.

To address this, in the present embodiment, the type of image to be selected by the viewers is estimated according to the distribution of viewers when the power is turned on, and also, the projection directions in which the projectors 20 project the segment images are changed in a period from when the power is turned on to when the image is displayed. This enables reduction of the preparation period necessary before the viewers can view the selected content item.

Although the present embodiment describes the case of performing the display mode selection when the power is turned on, the present disclosure is not limited to this. For example, the display mode selection may be performed when the content item is possibly switched to another by a viewer manipulation, such as when the projected content item finishes.

Hereinafter, the display mode selection will be described with reference to the flowchart in FIG. 6.

When the power is turned on, the horizontal distribution detecting unit 11 included in the projector control apparatus 10A obtains from the TOF sensor 30 the result of the detection of the distance to an object, and performs horizontal distribution detection for detecting the viewer distribution information indicating the distribution of the viewers in the room (S110). In the present embodiment, the viewer distribution information is the width direction distribution information indicating the distribution of the viewers in the width direction of the projection area.

From the TOF sensor 30, the horizontal distribution detecting unit 11 obtains, as the result of the current room detection, a gray-scale image representing the distance by pixel contrast. As described earlier, the gray-scale image has a higher luminance value when the distance is larger and a lower luminance value when the distance is smaller.

A room in a typical house has pieces of furniture such as a chair, a table, and a shelf. The result of the current room detection obtained from the TOF sensor 30 includes a result of detection of such objects other than the viewers. Therefore, the horizontal distribution detecting unit 11 according to the present embodiment obtains in advance a result of room detection when there is no viewer, and makes a comparison between a result of the current room detection obtained at the time of the horizontal distribution detection (first gray-scale image) and the result of the room detection when there is no viewer (second gray-scale image). The horizontal distribution detecting unit 11 makes a comparison between these detection results by comparing the luminance value of the first gray-scale image and the luminance value of the second gray-scale image on a pixel-by-pixel basis, and identifies a region(s) of the second gray-scale image having a luminance value different from the luminance value of the first gray-scale image. The horizontal distribution detecting unit 11 generates the width direction distribution information specifying the positions of the viewers in the width direction, from the shape and number of the regions.

Figure 7:
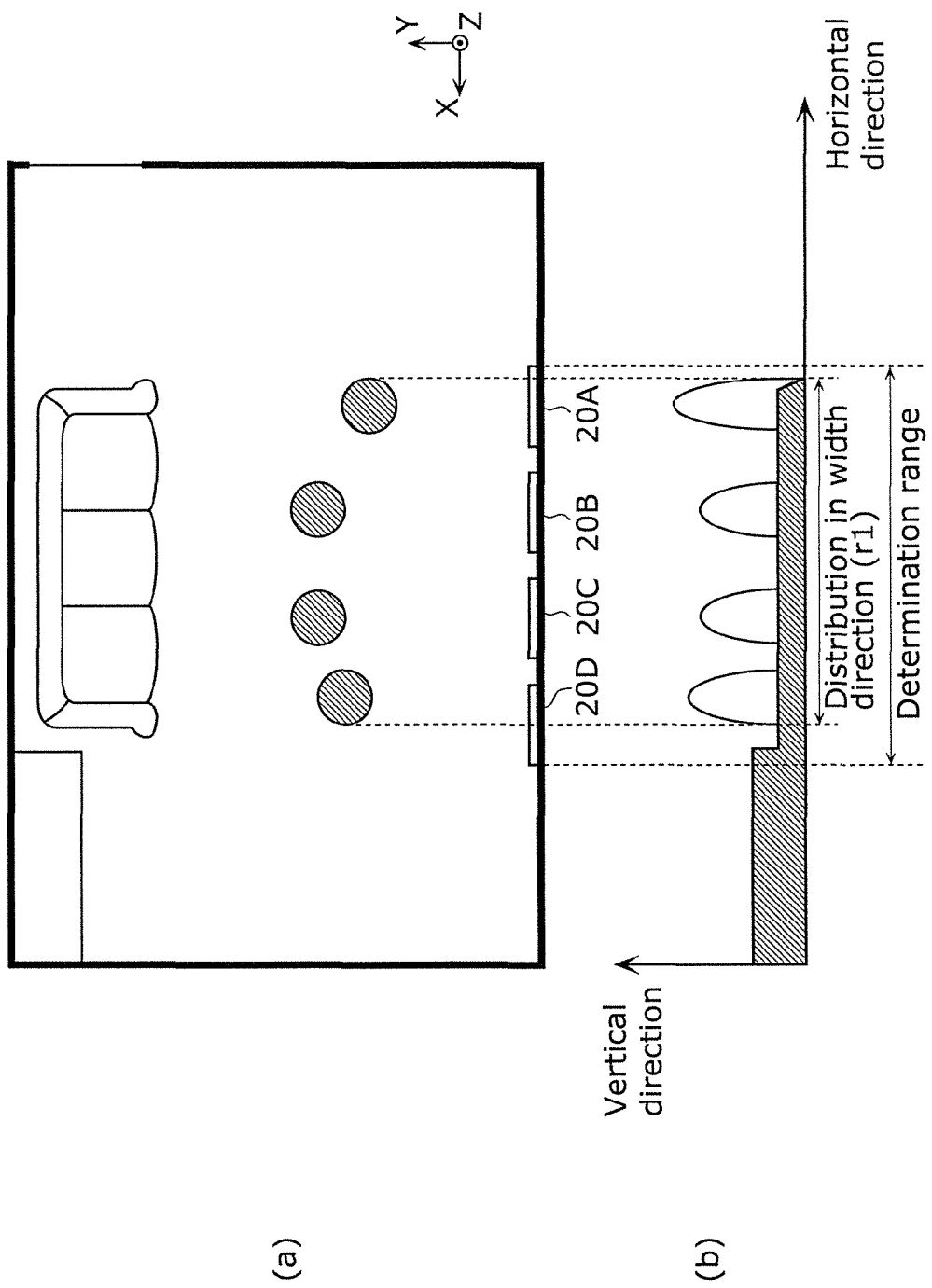
FIG. 7 illustrates an example of a distribution of viewers in a room according to Embodiment 1.

FIG. 7 illustrates an example of the distribution of the viewers in the room according to the present embodiment (the case where four viewers gather near the center of the room). (a) of FIG. 7 illustrates an example of the viewer positions, and (b) of FIG. 7 illustrates the detection result corresponding to (a). The diagonally shaded part in (b) of FIG. 7 illustrates the result of the room detection when there is no viewer, and the part with no diagonal shades denotes the difference between the first gray-scale image and the second gray-scale image. This part indicating the difference is detected as the viewer positions. In FIG. 7, a range r1 is detected as the range in which the viewers are present.

Figure 8:
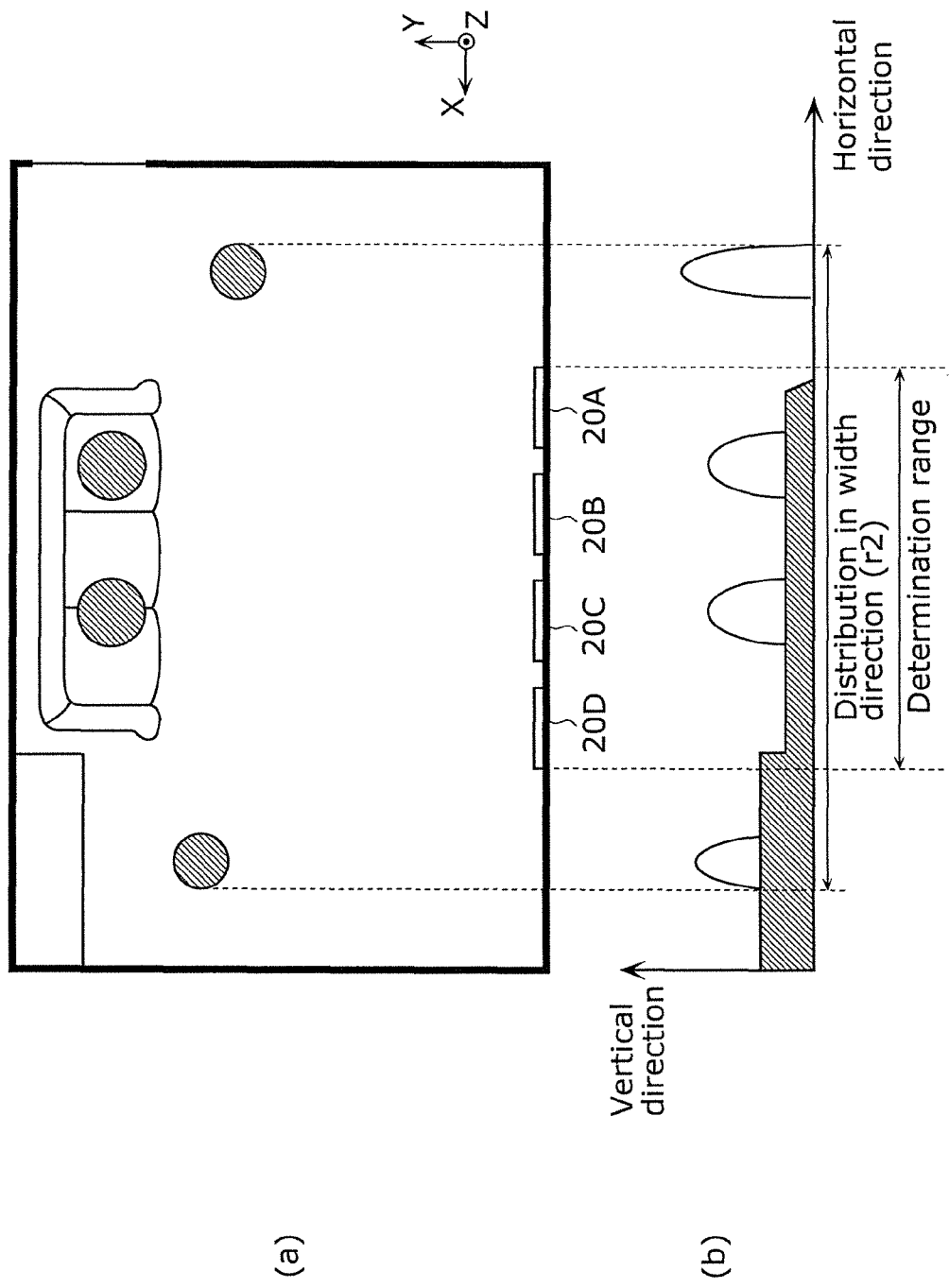
FIG. 8 illustrates another example of a distribution of viewers in a room according to Embodiment 1.

FIG. 8 illustrates another example of the distribution of the viewers in the room according to the present embodiment (the case where four viewers are dispersed in the width direction). (a) of FIG. 8 illustrates an example of the viewer positions, and (b) of FIG. 8 illustrates the detection result corresponding to (a). As in FIG. 7, the diagonally shaded part in (b) of FIG. 8 illustrates the result of the room detection when there is no viewer, and is an image showing the furniture and the like in the room by gray scale according to the distance. The part with no diagonal shades denotes the difference between the first gray-scale image and the second gray-scale image. In FIG. 8, a range r2 is detected as the range in which the viewers are present.

The mode selecting unit 12 performs the display mode selection using the viewer distribution information, which is, in the present embodiment, the width direction distribution information (S120).

As described earlier, in the present embodiment, the display modes include the first mode in which the width of the projection area is the first width (FIG. 4), and the second mode in which the width of the projection area is the second width larger than the first width (FIG. 5).

The mode selecting unit 12 first determines, from the width direction distribution information, whether or not at least one viewer is present outside a determination range. In the present embodiment, the determination range is set larger than the width of the projection area in the first mode, i.e., larger than the first width, and smaller than the width of the projection area in the second mode, i.e., smaller than the second width.

In the case of FIG. 7, the mode selecting unit 12 determines that no viewer is present outside the determination range, because the range r1 of the distribution in the width direction is smaller than the determination range. In the case of FIG. 8, the mode selecting unit 12 determines that viewers are present outside the determination range, because the range r2 of the distribution in the width direction is larger than the determination range.

When determining that no viewer is present outside the determination range, the mode selecting unit 12 estimates that the viewers will view a normal image, and thus selects the first mode. When determining that at least one viewer is present outside the determination range, the mode selecting unit 12 estimates that the viewers will view a wide image, and thus selects the second mode.

In the case of FIG. 7, the mode selecting unit 12 determines that no viewer is present outside the determination range, and thus selects the first mode. In the case of FIG. 8, the mode selecting unit 12 determines that some viewers are present outside the determination range, and thus selects the second mode.

The mechanism control unit 13 performs panhead control according to the display mode selected (S130).

More specifically, the mechanism control unit 13 outputs a control signal to each panhead control mechanism 22 to move the corresponding panhead 21, when there is a difference between the display mode which had been set at the previous power-off and the display mode selected in Step S120 performed after the current power-on.

When the display mode is switched to the first mode, the mechanism control unit 13 outputs, to the projector 20A, a control signal for setting the projection direction of the projector 20A to a direction that allows the segment image P11 to be projected at the bottom-left position in the projection area (see FIG. 4). Similarly, the mechanism control unit 13 outputs, to the projector 20B, a control signal for setting the projection direction of the projector 20B to a direction that allows the segment image P12 to be projected at the top-left position in the projection area. The mechanism control unit 13 outputs, to the projector 20C, a control signal for setting the projection direction of the projector 20C to a direction that allows the segment image P13 to be projected at the top-right position in the projection area. The mechanism control unit 13 outputs, to the projector 20D, a control signal for setting the projection direction of the projector 20D to a direction that allows the segment image P14 to be projected at the bottom-right position in the projection area.

When the display mode is switched to the second mode, the mechanism control unit 13 outputs, to the projector 20A, a control signal for setting the projection direction of the projector 20A to a direction that allows the segment image P21 to be projected at the leftmost position in the projection area (see FIG. 5). Similarly, the mechanism control unit 13 outputs, to the projector 20B, a control signal for setting the projection direction of the projector 20B to a direction that allows the segment image P22 to be projected at the second leftmost position in the projection area. The mechanism control unit 13 outputs, to the projector 20C, a control signal for setting the projection direction of the projector 20C to a direction that allows the segment image P23 to be projected at the third leftmost position (the second rightmost position) in the projection area. The mechanism control unit 13 outputs, to the projector 20D, a control signal for setting the projection direction of the projector 20D to a direction that allows the segment image P24 to be projected at the rightmost position in the projection area.

The image editing unit 14 performs image processing and synchronous output processing (S140).

In the present embodiment, the image editing unit 14 performs the image processing and the synchronous output processing in parallel with the panhead control performed by the mechanism control unit 13.

The image editing unit 14 in the present embodiment first selects a content item according to the display mode selected. When the display mode which had been set at the previous power-off is the same as the display mode selected in Step S120, the image editing unit 14 selects the content item which had been projected at the previous power-off. When the display mode which had been set at the previous power-off is different from the display mode selected in Step S120, the image editing unit 14 selects a content item from among content items corresponding to the display mode selected after the current power-on. The content item may be selected in any manner: the image editing unit 14 may select, for example, a content item which has been viewed many times, a content item selected from preference information, or a recent content item which corresponds to the selected display mode and is included in content items indicated in a viewing history.

The image editing unit 14 divides an image of the selected content item according to the display mode. As illustrated in FIG. 4 and FIG. 5, the image is divided into two rows×two columns in the case of the normal image, and the image is divided into one row×four columns in the case of the wide image. The image editing unit 14 outputs each of the segment images to the I/F unit 15.

The I/F unit 15 outputs each segment image edited by the image editing unit 14, to the corresponding one of the projectors 20 in synchronization. It is to be noted that the I/F unit 15 starts transmitting the segment images to the projectors 20 when the mechanism control unit 13 finishes the panhead control or while the mechanism control unit 13 performs the panhead control. Although not illustrated in the drawings, the I/F unit 15 outputs audio data to an audio output apparatus in synchronization with the output of the segment images.

1-3. Advantageous Effect Etc.

As described above, in the present embodiment, the projector system 100 that causes plural projectors to project an image estimates a display mode to be selected by the viewers, based on the distribution of the viewers in the horizontal direction when the power is turned on, for example, and controls the panheads according to the display mode without waiting for a viewer manipulation. This enables reduction of the preparation period from the power-on by the viewers to the display of the image selected by the viewers.

With conventional projector systems, in the time period from the power-on by the viewers to the actual image display, there is a time lag caused by the change of the projection directions of the projectors, in addition to a time lag caused by the decoding of images and audio. To address this, the projector control apparatus 10A and the projector system 100 according to the present embodiment start the panhead control during the time lag caused by the decoding of the images and audio. It is thus possible to reduce the time period from the power-on by the viewers to the actual image display.

Furthermore, in the present embodiment, when at least one viewer is present outside the determination range set in the width direction, it is estimated that the viewers will view a wide image, and thus the second mode is selected, whereas when no viewer is present outside the determination range, it is estimated that the viewers will view a normal image, and thus the first mode is selected. This enables appropriate estimation as to whether the viewers will view a normal image or a wide image, according to the action of the viewers.

It is to be noted that the display mode may be changed not only when the remote control is activated, but also when, based on sensor information extracted at predetermined intervals, (i) it is detected that the distribution of the viewers has significantly changed or (ii) it is predicted that the distribution of the viewers will significantly change due to a movement of the viewers. In that case, the image may be edited according to the display mode (normal image mode or the wide image mode, for example) without changing the content item itself.

Embodiment 2

Hereinafter, Embodiment 2 will be described with reference to FIG. 9 and FIG. 10.

In Embodiment 1, the width direction distribution information is detected which indicates, as the distribution in the horizontal direction, the distribution in the width direction of the projection area (X direction), and (i) the first mode for projecting the normal image is selected when no viewer is present outside the determination range, and (ii) the second mode for projecting the wide image is selected when the viewers are dispersed across the determination range. In the present embodiment, as the viewer distribution information, depth direction distribution information is detected which indicates a distribution in the depth direction (Y direction), and (i) the first mode for projecting the normal image is selected when at least one viewer is present between the projection area and a predetermined position, and (ii) the second mode for projecting the wide image is selected when no viewer is present between the projection area and the predetermined position.

2-1. Overall Configuration

As in Embodiment 1, the projector system 100 according to the present embodiment includes projectors 20A through 20D, a TOF sensor 30, a remote control 40, and a projector control apparatus 10A. It is to be noted that the configurations of the projectors 20A through 20D, the TOF sensor 30, and the remote control 40 are the same as those in Embodiment 1.

[2-1-1. Projector Control Apparatus]

As in Embodiment 1, the projector control apparatus 10A according to the present embodiment includes a horizontal distribution detecting unit 11, a mode selecting unit 12, a mechanism control unit 13, an image editing unit 14, and an I/F unit 15. It is to be noted that the configurations of the mechanism control unit 13, the image editing unit 14, and the I/F unit 15 are the same as those in Embodiment 1.

The horizontal distribution detecting unit 11 in the present embodiment detects, as the viewer distribution information indicating a distribution of the viewers in the space where the projectors 20A through 20D are mounted, depth direction distribution information indicating a distribution of the viewers in the depth direction.

Figure 9:
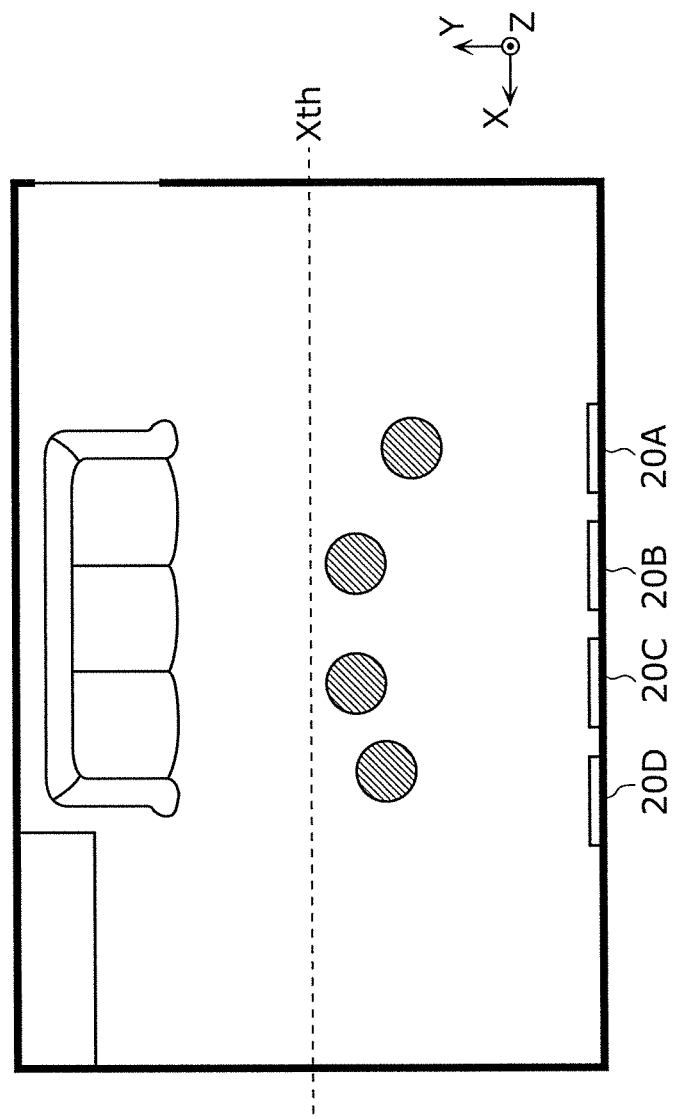
FIG. 9 illustrates an example of a distribution of viewers in a room according to Embodiment 2.
Figure 10:
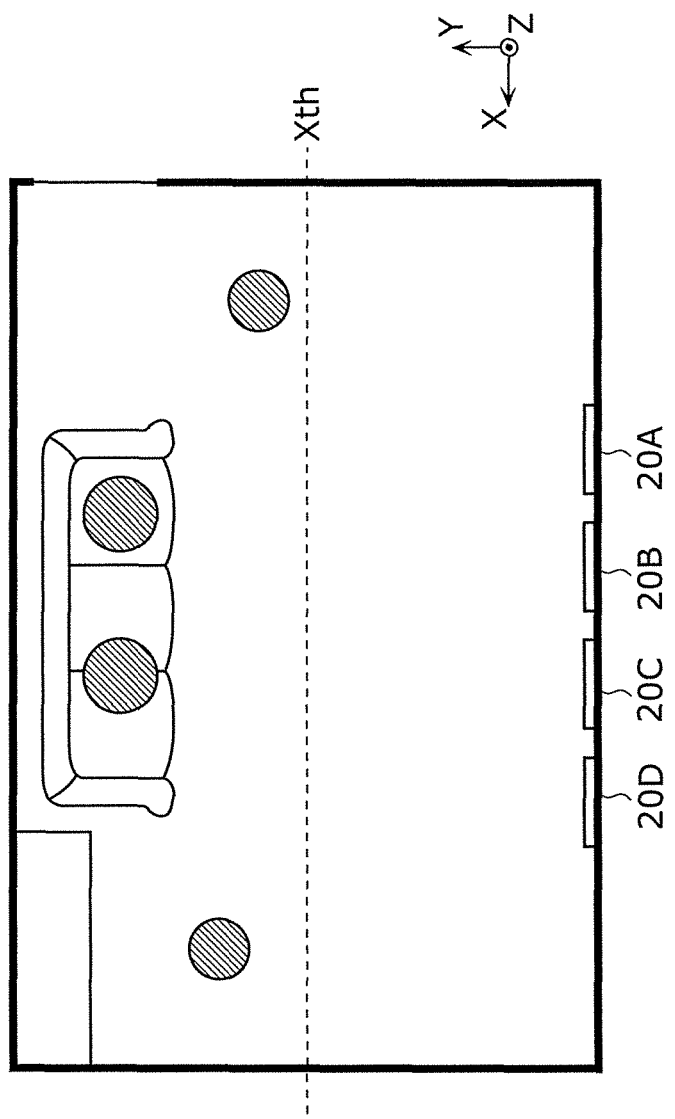
FIG. 10 illustrates another example of a distribution of viewers in a room according to Embodiment 2.

FIG. 9 illustrates an example of the distribution of the viewers in the room according to the present embodiment (the case where four viewers are in an area of the room closer to the projection area). FIG. 10 illustrates another example of the distribution of the viewers in the room according to the present embodiment (the case where four viewers are in an area of the room farther away from the projection area).

In the case of FIG. 9, it is determined that the viewers are present between the projection area and a predetermined position Xth. In the case of FIG. 10, it is determined that no viewer is present between the projection area and the predetermined position Xth.

As in Embodiment 1, the mode selecting unit 12 selects a display mode according to the viewer distribution information detected by the horizontal distribution detecting unit 11.

In the present embodiment, the mode selecting unit 12 selects the first mode when determining that at least one viewer is present between the projection area and the predetermined position Xth, and selects the second mode when determining that no viewer is present between the projection area and the predetermined position Xth.

When the viewers are evenly distributed across the predetermined position Xth, the display mode may be determined according to the distribution of the viewers in the X direction as described in Embodiment 1. The subject of the determination need not be all of the viewers, and may be a majority of the viewers, such as 80% of the viewers. More specifically, it may be determined that viewers are present between the projection area and the predetermined position Xth when 80% of the viewers are present between the projection area and the predetermined position Xth, otherwise, it may be determined that no viewer is present between the projection area and the predetermined position Xth, for example. It is to be noted that this detection in the depth direction may be performed using the distance information output from the TOF sensor 30, or may be performed through estimation based on the size of the viewers shown in an image captured and output by an imaging device.

2-2. Advantageous Effect Etc.

In the present embodiment, the display mode is selected according to the depth direction distribution information. This enables appropriate estimation as to whether the viewers will view a normal image or a wide image, according to the action of the viewers.

Embodiment 3

Hereinafter, Embodiment 3 will be described with reference to FIG. 11 through FIG. 14.

The present embodiment will describe the case of using, in addition to the width direction distribution information, information indicating a distribution of viewers' eyes in the vertical direction (hereinafter also referred to as "vertical distribution information"). The projector control apparatus and the projector system according to the present embodiment detect the height of the viewers' eyes from the vertical distribution information, and adjust the height of the projection area from the floor according to the height of the viewers' eyes.

3-1. Overall Configuration

Figure 11:
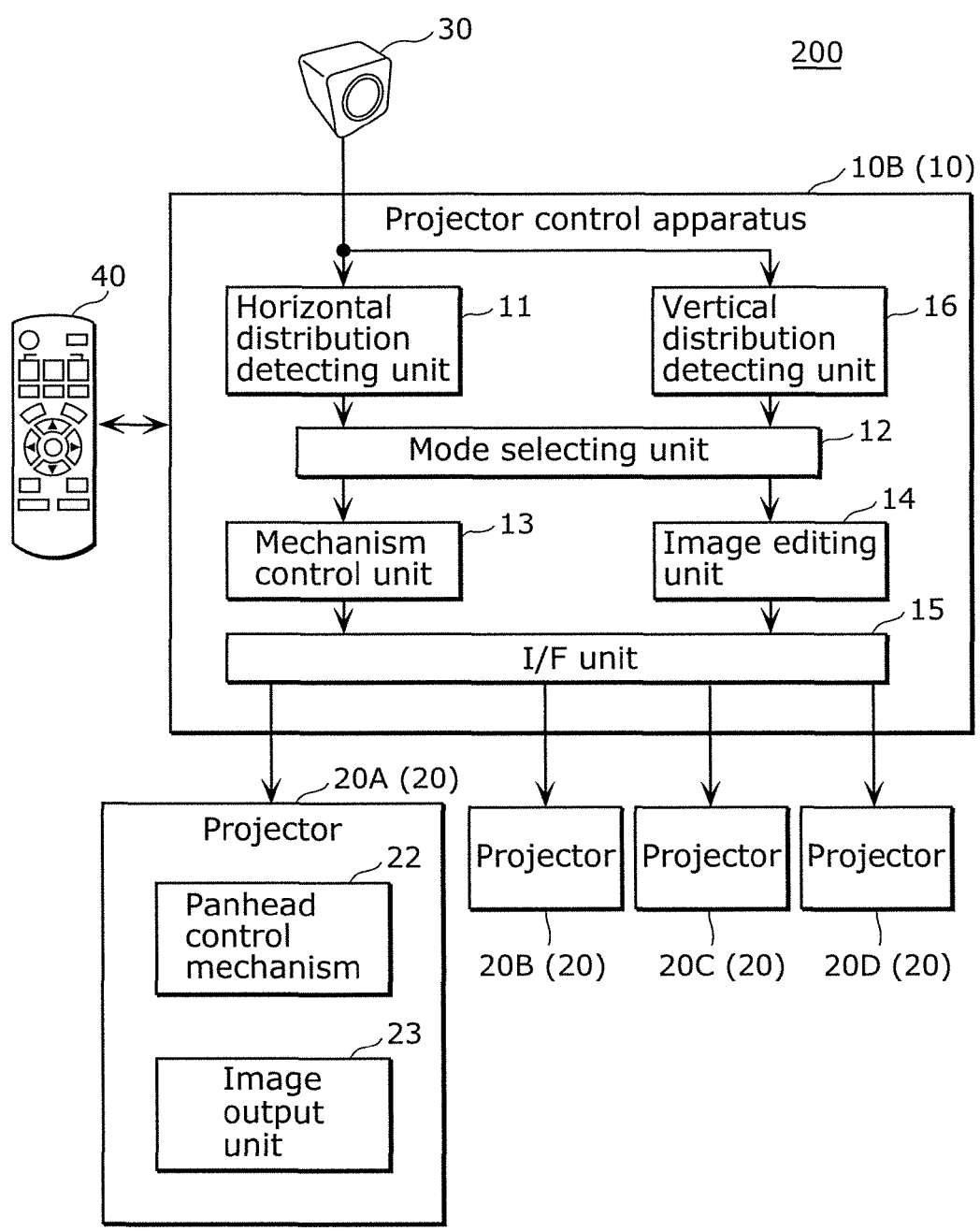
FIG. 11 is a block diagram illustrating an example of the configuration of a projector system according to Embodiment 3.

FIG. 11 is a block diagram illustrating an example of the configuration of a projector system 200 according to the present embodiment.

As illustrated in FIG. 11, the projector system 200 includes projectors 20A through 20D, a TOF sensor 30, a remote control 40, and a projector control apparatus 10B. It is to be noted that the configurations of the projectors 20A through 20D, the TOF sensor 30, and the remote control 40 are the same as those in Embodiment 1.

[3-1-1. Projector Control Apparatus]

The projector control apparatus 10B includes a vertical distribution detecting unit 16 in addition to the horizontal distribution detecting unit 11, the mode selecting unit 12, the mechanism control unit 13, the image editing unit 14, and the I/F unit 15 according to Embodiment 1. It is to be noted that the configurations of the horizontal distribution detecting unit 11, the image editing unit 14, and the I/F unit 15 are the same as those in Embodiment 1.

The vertical distribution detecting unit 16 detects the vertical distribution information according to the information provided from the TOF sensor 30. The vertical distribution detecting unit 16 and the horizontal distribution detecting unit 11 are examples of the spatial distribution information obtaining unit that obtains the viewer distribution information indicating a distribution of viewers in the space where the projectors 20A through 20D are mounted.

As in Embodiment 1, the mode selecting unit 12 selects a display mode according to the width direction distribution information detected by the horizontal distribution detecting unit 11. In addition, the mode selecting unit 12 according to the present embodiment sets the height of the projection area of the image according to the vertical distribution information obtained by the vertical distribution detecting unit 16.

The mechanism control unit 13 according to the present embodiment sets the projection area of each segment image, based on the height of the projection area of the image and the display mode that are set by the mode selecting unit 12.

3-2. Operations (Projector Control Method)

Figure 12:
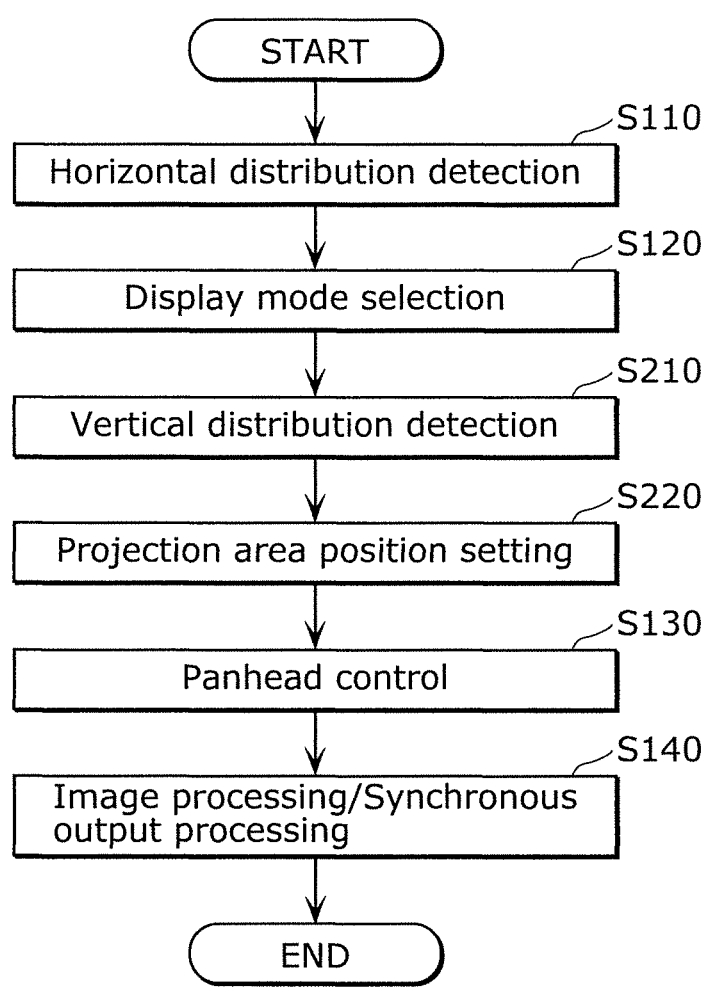
FIG. 12 is a flowchart illustrating an example of the procedures of display mode selection (projector control method) according to Embodiment 3.

FIG. 12 is a flowchart illustrating an example of the procedures of the display mode selection (projector control method) according to the present embodiment.

When the power is turned on, the horizontal distribution detecting unit 11 included in the projector control apparatus 10B obtains from the TOF sensor 30 the result of the detection of the distance to an object, and performs the horizontal distribution detection for detecting the width direction distribution information indicating the distribution, in the width direction of the projection area, of the viewers present in the room, as in Embodiment 1 (S110). The procedures of the horizontal distribution detection are the same as in Embodiment 1.

The mode selecting unit 12 performs the display mode selection using the width direction distribution information (S120). The procedures of the display mode selection are the same as in Embodiment 1.

The vertical distribution detecting unit 16 obtains from the TOF sensor 30 the result of the detection of the distance to the object, and performs the vertical distribution detection for detecting the vertical distribution information indicating the distribution of the viewers' eyes in the vertical direction (S210).

In more detail, as described earlier, the vertical distribution detecting unit 16 obtains from the TOF sensor 30 the first gray-scale image representing the distance by pixel contrast, as the result of the current room detection. The gray-scale image provided to the horizontal distribution detecting unit 11 and the gray-scale image provided to the vertical distribution detecting unit 16 are the same.

Here, the result of the detection by the TOF sensor 30 includes not only the result of detecting the viewers but also a result of detecting an object other than the viewers, such as furniture, and thus, like the horizontal distribution detecting unit 11 according to Embodiment 1, the vertical distribution detecting unit 16 obtains in advance a result of room detection when there is no viewer (second gray-scale image), and makes a comparison between the first gray-scale image and the second gray-scale image. The vertical distribution detecting unit 16 makes a comparison between the detection results by comparing the luminance value of the first gray-scale image and the luminance value of the second gray-scale image on a pixel-by-pixel basis, and identifies a region of the second gray-scale image having a luminance value different from the luminance value of the first gray-scale image. The vertical distribution detecting unit 16 obtains the vertical distribution information using the comparison result, and determines the height of the viewers' eyes from the vertical distribution information.

Figure 13:
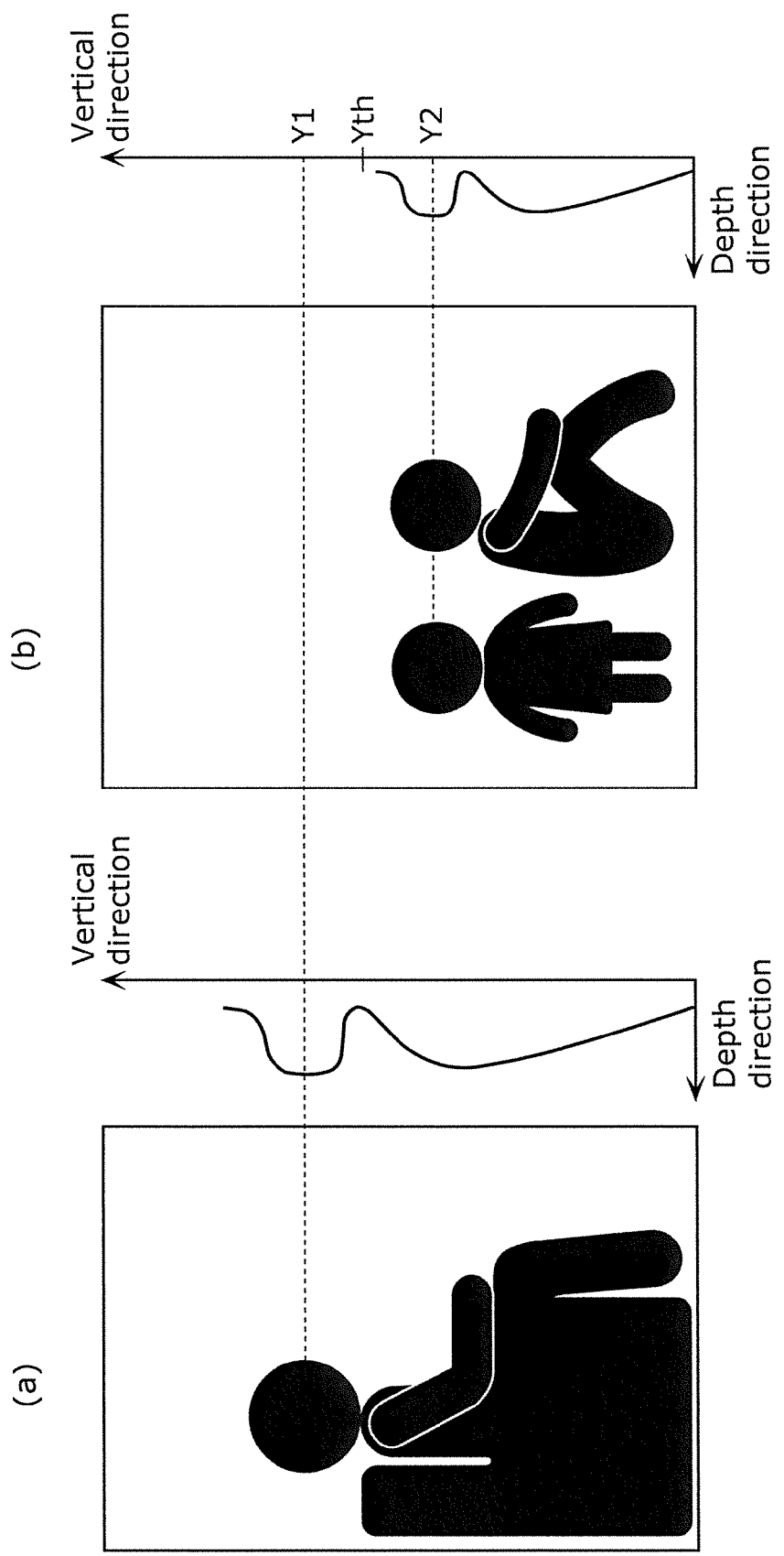
FIG. 13 illustrates examples of the result of detection, by a vertical distribution detecting unit according to Embodiment 3, of the distribution of viewers in the vertical direction.

FIG. 13 illustrates examples of the result of detection, by the vertical distribution detecting unit 16 according to the present embodiment, of the distribution of the viewers in the vertical direction. FIG. 13 shows graphs each having two axes in the vertical direction and the depth direction and showing a gray-scale image based on the distance information obtained from the TOF sensor 30. (a) in FIG. 13 illustrates an example of the detection result when there is an adult (sitting) in the room, and (b) in FIG. 13 illustrates an example of the detection result when there is a child (standing or sitting) in the room. From (a) in FIG. 13, the height of the eyes when there is an adult in the room is determined to be Y1. From (b) in FIG. 13, the height of the eyes when there is a child in the room is determined to be Y2.

When there are both an adult and a child in the room, the height of the eyes may be determined to be Y1, i.e., the height of the eyes of the adult, for example. Furthermore, when there are both an adult and a child in the room, the height of the eyes may be determined to be such a value as the average or the median, for example. Although FIG. 13 illustrates the images showing the depth direction and the vertical direction, a distance image generated by capturing in the horizontal direction and the vertical direction may be used as in (b) of FIG. 7.

The mode selecting unit 12 sets the position of the projection area in which the image is to be projected, according to the height of the eyes determined by the vertical distribution detecting unit 16 (S220).

In the present embodiment, the projection area of the image is set higher when the height of the eyes of the viewer in the room is higher as illustrated in (a) in FIG. 13, whereas the projection area of the image is set lower when the height of the eyes of the viewer in the room is lower as illustrated in (b) in FIG. 13.

Figure 14:
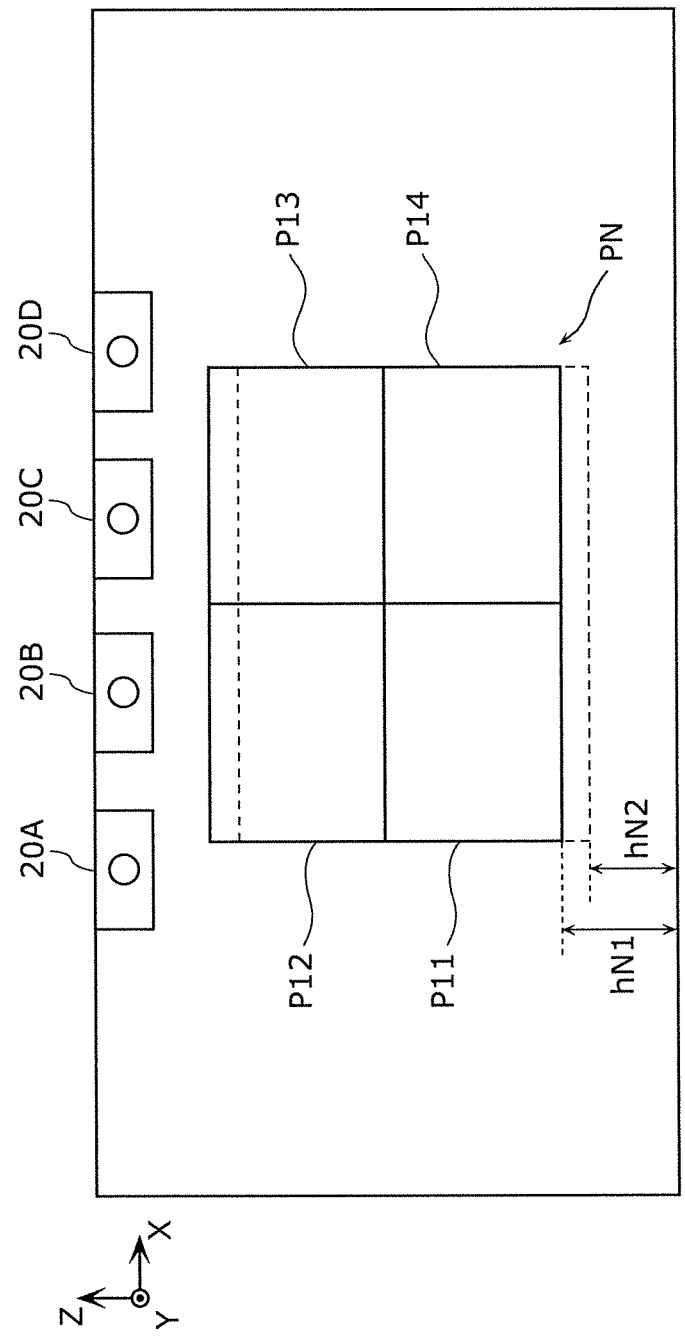
FIG. 14 illustrates an example of a method of adjusting the position of a projection area according to Embodiment 3.

FIG. 14 illustrates an example of a method of adjusting the position of the projection area according to the present embodiment. In the present embodiment, the mode selecting unit 12 sets the position of the projection area to either the height hN1 or height hN2 from the floor. More specifically, when the height of the eyes is higher than a threshold Yth, the mode selecting unit 12 sets the height of the lower end of the projection area from the floor to hN1. When the height of the eyes is lower than the threshold Yth, the mode selecting unit 12 sets the height of the lower end of the projection area from the floor to hN2.

Although the position of the projection area (height from the floor) is set in two levels in the present embodiment, the present disclosure is not limited to this. The position of the projection area may be set in a greater number of levels.

The mechanism control unit 13 performs the panhead control according to the display mode and the position of the projection area of the image that are set by the mode selecting unit 12 (S130).

More specifically, the mechanism control unit 13 outputs to the panhead control mechanism 22 a signal for moving the panhead 21, when there is a difference between (i) the display mode and the position of the projection area of the image that had been set at the previous power-off and (ii) the display mode and the position of the projection area of the image that are set after the current power-on.

The image editing unit 14 performs image processing and synchronous output processing (S140).

The procedures of the image processing and the synchronous output processing are the same as in Embodiment 1.

3-3. Variation of Embodiment 3

Although the present embodiment has illustrated the case where the height of a viewer's eyes is determined using the vertical direction distribution information, the present disclosure is not limited to this. The height of a viewer's eyes may be determined by capturing an image of the viewer using a camera, for example, and detecting the position of the viewer's eyes through an analysis of the captured image. The height of the viewer's eyes may also be determined based on a combination of the distribution in the vertical direction and the image of the viewer captured using a camera, for example.

In the present embodiment, the method of adjusting the height of the projection area according to the present embodiment is combined with the display mode selection performed using the width direction distribution information according to Embodiment 1. However, the method may be combined with the display mode selection performed using the depth direction distribution information according to Embodiment 2.

3-4. Advantageous Effect Etc.

The projector control apparatus 10B included in the projector system 200 according to the present embodiment adjusts the position of the projection area according to the height of a viewer's eyes. Thus, the projection position is automatically adjusted to the position estimated to be a position allowing the viewer to easily view the projected image. For example, the projector control apparatus 10B sets the projection area to a relatively high position in the case of an adult, and sets the projection area to a relatively low position when the position of the eyes is relatively low as in the case of a child. This reduces the trouble for the viewer to re-set the position of the projection area.

The height adjustment according to the present embodiment may be performed not only at the time of power-on but may also be automatically performed when a content item is switched to another. Moreover, the height adjustment may also be automatically performed by the apparatus determining the height to be adjusted to, when a viewer manipulation is performed on the remote control.

Embodiment 4

Hereinafter, Embodiment 4 will be described with reference to FIG. 15 and FIG. 16.

In the present embodiment, when there are plural viewers, the display mode is selected using the distribution in the horizontal direction (the width direction distribution information or the depth direction distribution information) as in Embodiments 1 through 3, whereas when the number of viewers is one, the display mode is selected according to the preference of the viewer.

4-1. Overall Configuration

Figure 15:
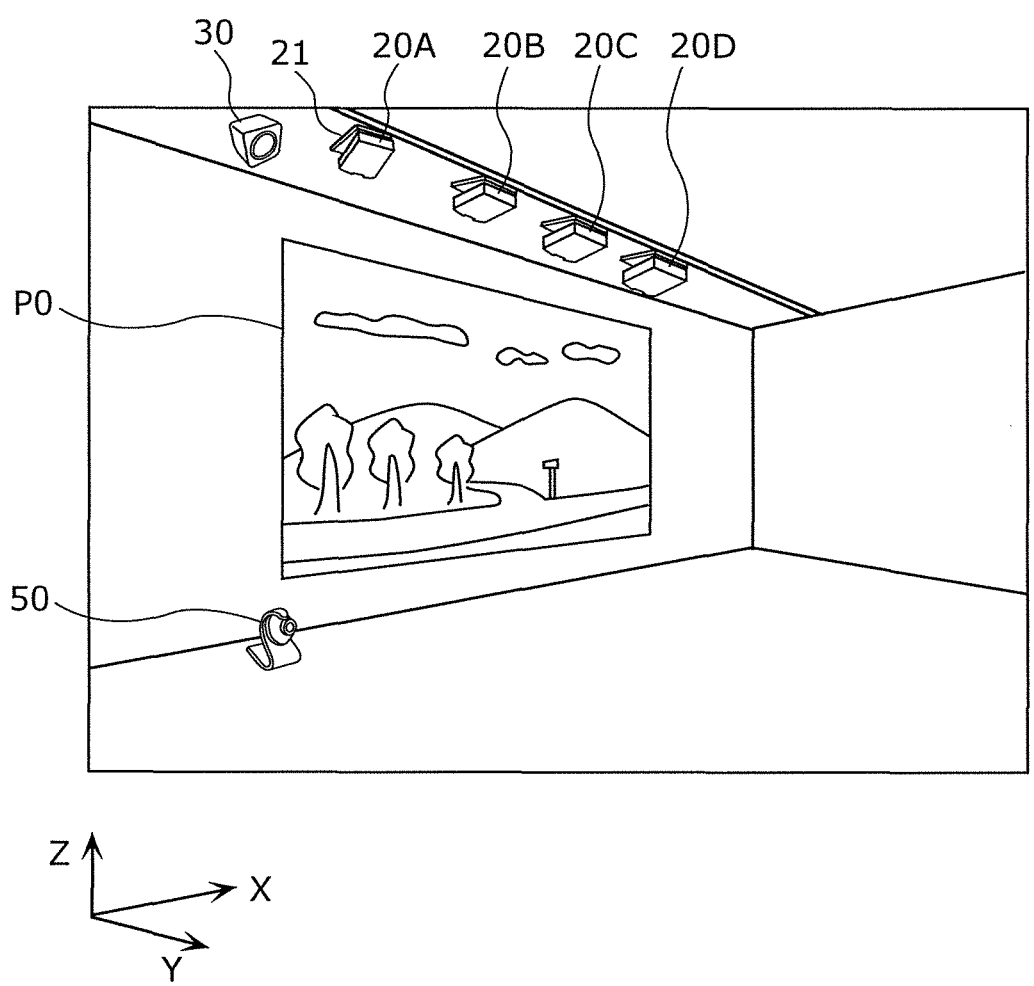
FIG. 15 is a perspective view illustrating an example of a setup of a projector system according to Embodiment 4.

FIG. 15 is a perspective view illustrating an example of a setup of a projector system 300 according to the present embodiment. FIG. 16 is a block diagram illustrating an example of the configuration of the projector system 300 according to the present embodiment.

Figure 16:
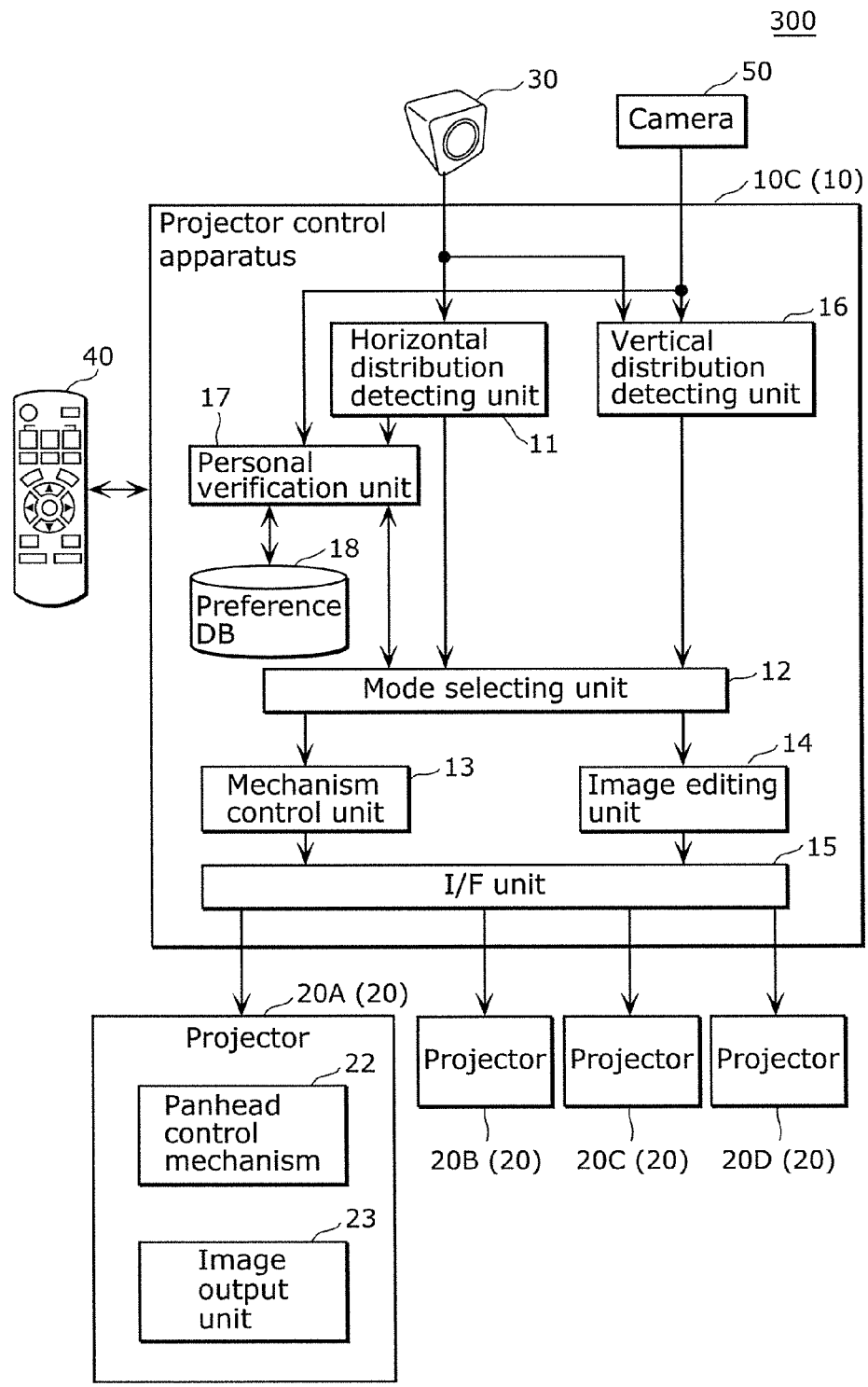
FIG. 16 is a block diagram illustrating an example of the configuration of a projector system according to Embodiment 4.

As illustrated in FIG. 15 and FIG. 16, the projector system 300 includes projectors 20A through 20D, a TOF sensor 30, a remote control 40, a camera 50, and a projector control apparatus 10C. It is to be noted that the configurations of the projectors 20A through 20D, the TOF sensor 30, and the remote control 40 are the same as those in Embodiment 1.

[4-1-1. Camera]

The camera 50 is a camera capable of face recognition by image analysis. The camera 50 automatically captures an image of a viewer(s) in response to a capturing request from the projector control apparatus 10C.

Since the viewer(s) is (are) considered to be facing the projection area, the camera 50 is mounted on or near the wall on which an image is projected. In FIG. 15, the camera 50 is mounted on the floor near the wall. The camera 50 may be hung from the ceiling like the TOF sensor 30.

[4-1-2. Projector Control Apparatus]

The projector control apparatus 10C includes a personal verification unit 17 and a preference database (DB) 18 in addition to the horizontal distribution detecting unit 11, the mode selecting unit 12, the mechanism control unit 13, the image editing unit 14, the I/F unit 15, and the vertical distribution detecting unit 16 according to Embodiment 3. It is to be noted that the configurations of the mechanism control unit 13, the image editing unit 14, the I/F unit 15, and the vertical distribution detecting unit 16 are the same as those in Embodiment 3.

As in Embodiment 3, the horizontal distribution detecting unit 11 is an example of the spatial distribution information obtaining unit that obtains the viewer distribution information indicating a distribution of viewers in the space where the projectors 20A through 20D are mounted. The horizontal distribution detecting unit 11 detects the width direction distribution information or the depth direction distribution information (hereinafter abbreviated as "horizontal distribution information" where appropriate) according to the information obtained from the TOF sensor 30.

Furthermore, the horizontal distribution detecting unit 11 according to the present embodiment determines from the horizontal distribution information whether or not the number of viewers is one, and when determining that the number of viewers is one, notifies the personal verification unit 17 that the number of viewers is determined to be one.

When the horizontal distribution detecting unit 11 determines that the number of viewers is one, the personal verification unit 17 obtains from the camera 50 a captured image of the viewer and verifies the viewer by analyzing the captured image. The details will be described later.

The preference DB 18 stores, for each viewer, viewer information associating personal verification information with preference information such as the viewer's viewing history. The personal verification information is information necessary for personal verification. In the present embodiment, personal verification is performed by analyzing a captured image, and thus the personal verification information includes the amount of features of the image of the viewer's face.

When the horizontal distribution detecting unit 11 determines that there are plural viewers, the mode selecting unit 12 selects a display mode according to the horizontal distribution information as in Embodiments 1 through 3. When the number of viewers is determined to be one, the mode selecting unit 12 selects a display mode according to the preference information of the viewer.

4-2. Operations (Projector Control Method)

Figure 17:
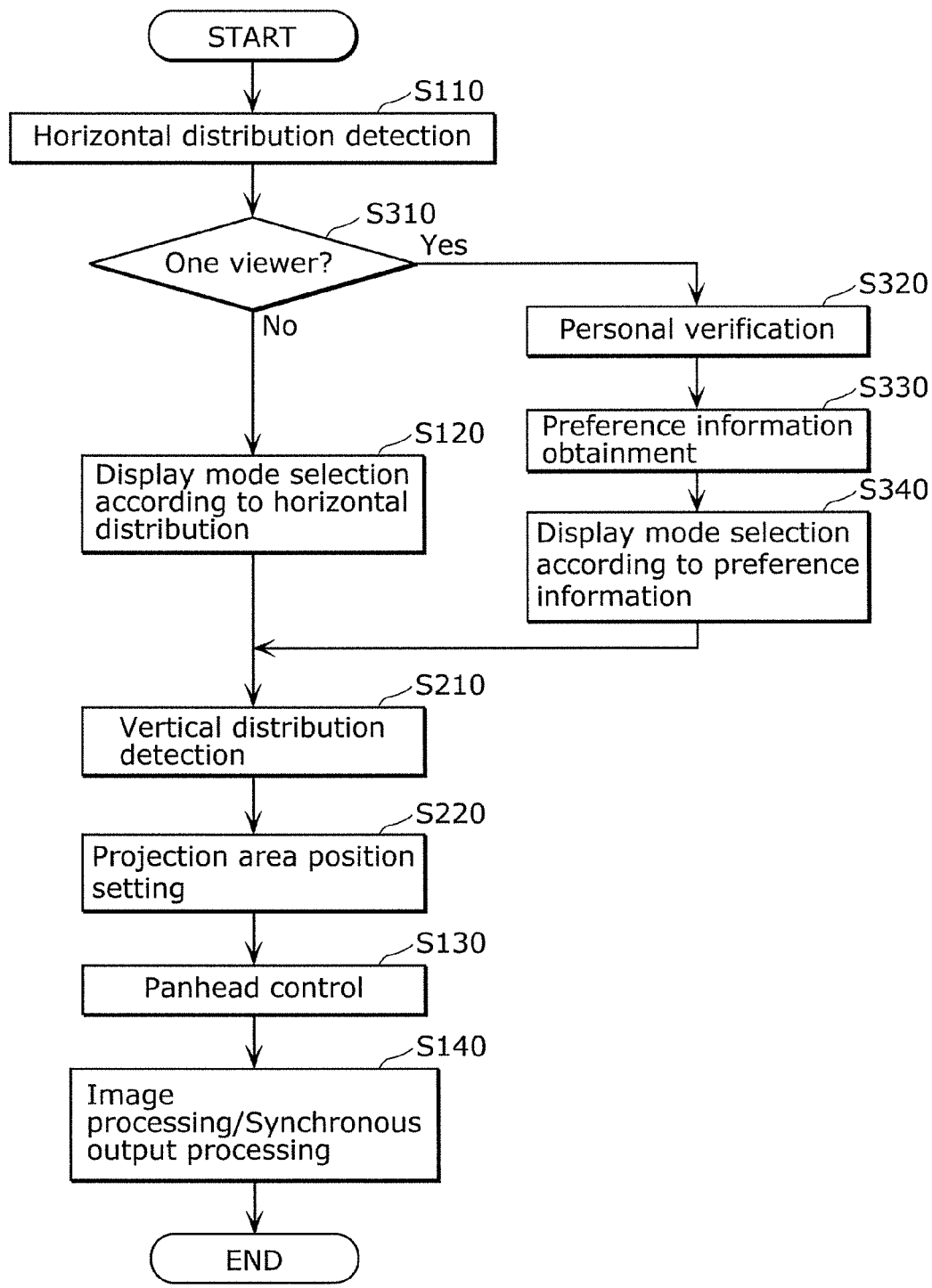
FIG. 17 is a flowchart illustrating an example of the procedures of display mode selection (projector control method) according to Embodiment 4.

FIG. 17 is a flowchart illustrating an example of the procedures of the display mode selection (projector control method) according to the present embodiment.

When the power is turned on, the horizontal distribution detecting unit 11 included in the projector control apparatus 10C obtains from the TOF sensor 30 the result of the detection of the distance to an object, and performs the horizontal distribution detection for detecting the width direction distribution information indicating the distribution, in the width direction of the projection area, of the viewer(s) present in the room, as in Embodiment 1 (S110). The procedures of the horizontal distribution detection are the same as in Embodiment 1.

Furthermore, the horizontal distribution detecting unit 11 according to the present embodiment determines from the width direction distribution information whether or not the number of viewers is one (S310).

When the horizontal distribution detecting unit 11 determines that the number of viewers is not one (No in S310), the mode selecting unit 12 performs the display mode selection using the width direction distribution information (S120). The procedures of the display mode selection are the same as in Embodiment 1.

When the horizontal distribution detecting unit 11 determines that the number of viewers is one (Yes in S310), the personal verification unit 17 performs personal verification for the viewer (S320). From the camera 50 that captures an image of the viewer, the personal verification unit 17 obtains the captured image of the viewer. From the captured image, the personal verification unit 17 obtains the amount of features of the image of the viewer's face. The personal verification unit 17 extracts, from the preference DB 18, viewer information including personal verification information that matches the amount of features of the face obtained from the captured image. The personal verification unit 17 obtains the preference information included in the viewer information extracted, and outputs the preference information to the mode selecting unit 12.

The mode selecting unit 12 obtains the preference information from the personal verification unit 17 (S330), and selects a display mode according to the preference information (S340). For example, the mode selecting unit 12 selects the first mode when the viewer often views a normal image such as a normal news program, and selects the second mode when the viewer often views a wide image such as a sports program.

After the mode selecting unit 12 selects the display mode (after performing S120 or S340), the vertical distribution detecting unit 16 obtains from the TOF sensor 30 the result of the detection of the distance to an object, and performs the vertical distribution detection for detecting the vertical distribution information indicating the distribution of the viewer's (viewers') eyes in the vertical direction (S210). The procedures of the vertical distribution detection are the same as in Embodiment 3.

The mode selecting unit 12 sets the position of the projection area in which the image is to be projected, according to the height of the eyes detected by the vertical distribution detecting unit 16 (S220). The procedures for setting the position of the projection area are the same as in Embodiment 3.

The mechanism control unit 13 performs the panhead control according to the display mode and the position of the projection area of the image that are set by the mode selecting unit 12 (S130). The operations of the mechanism control unit 13 are the same as in Embodiment 3.

The image editing unit 14 performs image processing and synchronous output processing (S140). The procedures of the image processing and the synchronous output processing are the same as in Embodiment 1.

4-3. Advantageous Effect Etc.

When the number of viewers is one, the projector control apparatus 10C according to the present embodiment selects the display mode according to the preference information of the viewer, and thus the display mode can be selected appropriately.

Other Embodiments

Embodiments 1 through 4 have been described to illustrate the technique disclosed in the present application. The technique according to the present disclosure, however, is not limited to these embodiments, and is also applicable to other embodiments conceived by various modifications, permutations, additions, and omissions in the above-described embodiments. Moreover, the structural elements described in Embodiments 1 through 4 may be combined to create a new embodiment.

In view of this, other embodiments will be described below as examples.

(1) Although the projector control apparatus 10 in Embodiments 1 through 4 detects the viewer distribution information using the TOF sensor 30, the present disclosure is not limited to this.

Figure 18A:
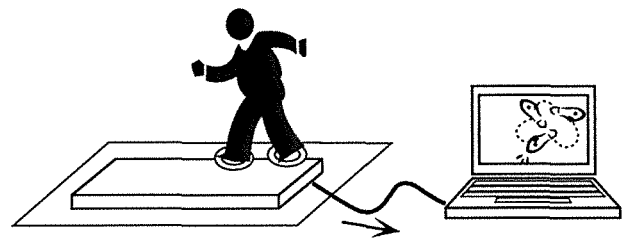
FIG. 18A illustrates an example of other sensors.
Figure 18B:
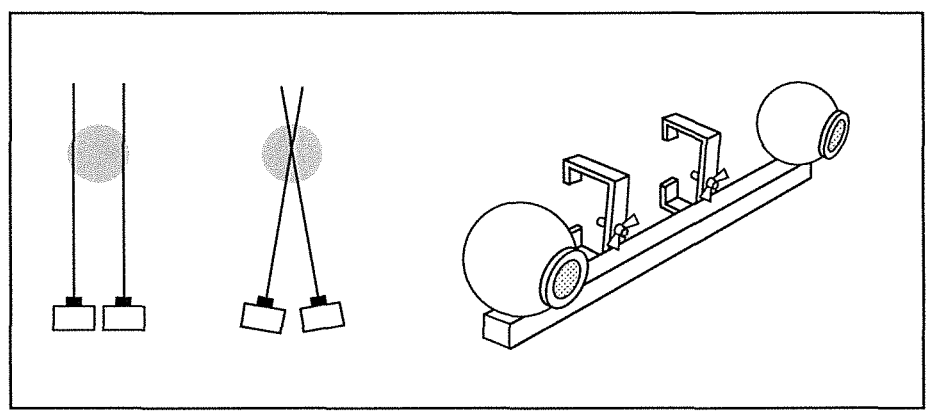
FIG. 18B illustrates an example of other sensors.
Figure 18C:
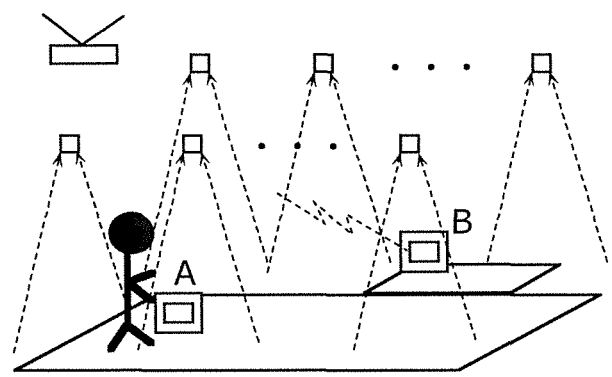
FIG. 18C illustrates an example of other sensors.

FIG. 18A through FIG. 18C illustrate examples of other sensors.

As illustrated in FIG. FIG. 18A, the horizontal distribution information may be detected using a sensor, such as a sheet-type sensor mounted under the floor that senses radio disturbance and/or the weight of an object above the sensor. Or, as illustrated in FIG. 18B, the horizontal distribution information and the vertical distribution information may be detected using a multiview camera. Or, as illustrated in FIG. 18C, the horizontal distribution information may be detected using radio frequency identification (RFID) that detects wireless chips possessed by individuals for personal verification. Or, the viewer distribution information may be detected using other sensors such as an infrared sensor (thermography). Furthermore, the above-described sensors may be used in combination.

(2) Although Embodiments 1 through 4 have described the case of using four projectors, the present disclosure is not limited to this. The number of projectors may be one or more than 4. For example, in the case of using m×m projectors where m is an integer greater than or equal to 2, the segment images may be arranged in m rows and m columns when the mode selecting unit 12 selects the first mode, and the segment images may be arranged in one row and (m×m) columns when the mode selecting unit 12 selects the second mode.

(3) Although Embodiments 1 through 4 have described the case where the four projectors are hung from the ceiling, the present disclosure is not limited to this. The projectors may be mounted at any position such as on the floor, on a dedicated base, or on furniture.

(4) Although Embodiments 1 through 4 have described the exemplary case where the projector control apparatus 10 is implemented using the dedicated server provided in the house, the projector control apparatus 10 may be implemented using a personal computer (PC) or a server on a cloud, for example. Moreover, the structural elements of the projector control apparatus 10 may be dispersedly implemented by plural apparatuses rather than a single server.

(5) Although Embodiments 1 through 4 have described the exemplary case where the display modes include the first mode for displaying a normal image and the second mode for displaying a wide image, the present disclosure is not limited to this. The display modes may also include a mode for displaying, for example, an image having an aspect ratio of 4:3, other than a digital image having an aspect ratio of 16:9 (normal image) and a wide image having an aspect ratio of 21:9.

The above embodiments have been described to illustrate the technique of the present disclosure. The accompanying drawings and detailed description are provided for this purpose.

Thus, the structural elements set forth in the accompanying drawings and the detailed description include not only the structural elements essential to solve the problems but also structural elements unnecessary to solve the problems for the purpose of illustrating the above technique. For this reason, those unnecessary structural elements should not be deemed essential due to the mere fact that they appear in the accompanying drawings and the detailed description.

The above-described embodiments illustrate the technique of the present disclosure, and thus various modifications, permutations, additions, and omissions are possible in the scope of the appended claims and the equivalents thereof.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present disclosure is applicable to a projector control apparatus, a projector system, and a projector control method that enable reduction of the preparation period necessary for image projection. More specifically, the present disclosure is applicable to a home theater and a conference system, for example.

The invention claimed is:

1. A projector control apparatus that causes plural projectors to collectively project an image by individually projecting a different one of segment images into which the image is divided, the projector control apparatus comprising:
a spatial distribution information obtaining unit which obtains information indicating a distribution of one or more viewers that view the image in a space where the projectors are mounted;
a mode selecting unit which selects, using the information indicating the distribution of the one or more viewers, one of modes including (i) a first mode in which a width of a projection area is a first width and (ii) a second mode in which the width of the projection area is a second width larger than the first width, the projection area being an area in which the image is projected; and
a projector control unit which changes arrangement of the segment images by controlling, according to the mode selected, each of projection directions in which the projectors project the segment images,
wherein in the case where the number of the projectors is n×m, the projector control unit is configured to control each of the projection directions in which the projectors project the segment images to (i) arrange the segment images in n rows and in columns when the mode selecting unit selects the first mode, and (ii) arrange the segment images in one row and (m×n) columns when the mode selecting unit selects the second mode.

2. The projector control apparatus according to claim 1, wherein the information indicating the distribution of the one or more viewers includes information indicating a distribution of the one or more viewers in a width direction of the projection area, and
the mode selecting unit is configured to:
determine, from the information indicating the distribution in the width direction, whether or not at least one of the one or more viewers is present outside a predetermined range; and
select the first mode when determining that none of the one or more viewers is present outside the predetermined range, and select the second mode when determining that at least one of the one or more viewers is present outside the predetermined range.

3. The projector control apparatus according to claim 1, wherein the information indicating the distribution of the one or more viewers includes information indicating a distribution of the one or more viewers in a depth direction, and
the mode selecting unit is configured to select the first mode when at least one of the one or more viewers is present between the projection area and a predetermined position, and select the second mode when none of the one or more viewers is present between the projection area and the predetermined position.

4. The projector control apparatus according to claim 1, wherein the information indicating the distribution of the one or more viewers includes information indicating a distribution of eyes of the one or more viewers in a vertical direction, and
the projector control unit is configured to set a position of the projection area in a height direction using the information indicating the distribution of the eyes of the one or more viewers in the vertical direction.

5. The projector control apparatus according to claim 1, wherein when the information indicating the distribution of the one or more viewers indicates that the number of the one or more viewers is one, the mode selecting unit is configured to obtain preference information and select either the first mode or the second mode using the preference information, the preference information indicating which one of the first mode and the second mode is more likely to be selected by the one viewer.

6. The projector control apparatus according to claim 1, wherein in the case where the number of the projectors is four, the projector control unit is configured to control each of the projection directions in which the projectors project the segment images to (i) arrange the segment images in two rows and two columns when the mode selecting unit selects the first mode, and (ii) arrange the segment images in one row and four columns when the mode selecting unit selects the second mode.

7. The projector control apparatus according to claim 1, wherein the spatial distribution information obtaining unit is configured to:
obtain, in advance, first space information indicating a distribution of one or more objects in the space, in a state where none of the one or more viewers is present;
obtain second space information indicating a distribution of the one or more viewers and the one or more objects in the space, in a state where the one or more viewers are present; and obtain the information indicating the distribution of the one or more viewers by comparing the first space information and the second space information.

8. The projector control apparatus according to claim 1, wherein the spatial distribution information obtaining unit is configured to obtain the information indicating the distribution of the one or more viewers using either a time of flight (TOF) sensor, an imaging device, radio frequency identification (RFID), or a sheet-type sensor.

9. A projector system comprising:
- plural projectors; and
- the projector control apparatus according to claim 1 that causes the plural projectors to collectively project an image.

10. A projector control method performed by a projector control apparatus that causes plural projectors to collectively project an image by individually projecting a different one of segment images into which the image is divided, the projector control method comprising:

obtaining information indicating a distribution of one or more viewers that view the image in a space where the projectors are mounted;

selecting, using the information indicating the distribution of the one or more viewers, one of modes including (i) a first mode in which a width of a projection area is a first width and (ii) a second mode in which the width of the projection area is a second width larger than the first width, the projection area being an area in which the image is projected; and changing arrangement of the segment images by controlling, according to the mode selected, each of projection directions in which the projectors project the segment images, wherein in the case where the number of the projectors is n×m, each of the projection directions in which the projectors project the segment images is controlled to (i) arrange the segment images in n rows and m columns when the first mode is selected, and (ii) arrange the segment images in one row and (m×n) columns when the second mode is selected.

* * * * *